(12) United States Patent
McGrath et al.

(10) Patent No.: US 10,750,674 B2
(45) Date of Patent: Aug. 25, 2020

(54) AIR-ROOT PRUNING PROPAGATION TRAY

(71) Applicant: VINELAND RESEARCH AND INNOVATION CENTRE, Vineland Station (CA)

(72) Inventors: Darby McGrath, Welland (CA); Jason Henry, Niagara Falls (CA)

(*) Notice: Subject to any disclaimer, the term of this patent is extended or adjusted under 35 U.S.C. 154(b) by 169 days.

(21) Appl. No.: 16/099,097

(22) PCT Filed: May 4, 2017

(86) PCT No.: PCT/CA2017/050547
§ 371 (c)(1),
(2) Date: Nov. 5, 2018

(87) PCT Pub. No.: WO2017/193210
PCT Pub. Date: Nov. 16, 2017

(65) Prior Publication Data
US 2019/0200539 A1 Jul. 4, 2019

Related U.S. Application Data

(60) Provisional application No. 62/333,971, filed on May 10, 2016.

(51) Int. Cl.
*A01G 9/029* (2018.01)
*A01G 9/00* (2018.01)

(52) U.S. Cl.
CPC ........... *A01G 9/0291* (2018.02); *A01G 9/029* (2018.02); *A01G 9/0295* (2018.02); *A01G 9/0297* (2018.02); *A01G 2009/003* (2013.01)

(58) Field of Classification Search
CPC .. A01G 9/0291; A01G 9/0295; A01G 9/0297; A01G 9/0299; A01G 9/023; A01G 9/02
See application file for complete search history.

(56) References Cited

U.S. PATENT DOCUMENTS 3,889,416 A * 6/1975 Bergeron ............... B65D 25/02
47/86
4,242,834 A 1/1981 Olsen
(Continued)

FOREIGN PATENT DOCUMENTS

DE 102006056285 A1 * 6/2008 ........... A47F 7/0078
EP 0836801 A2 4/1998
(Continued)

OTHER PUBLICATIONS

European Search Report dated Nov. 6, 2019 on EP 17796216.5.
(Continued)

*Primary Examiner* — Kristen C Hayes
(74) *Attorney, Agent, or Firm* — Brunet & Co., Ltd.; Hans Koenig; Robert Brunet

(57) ABSTRACT

A propagation tray for growing a plurality of plug plants in bounded transplantable growing media has two spaced apart aperture plates. The plug plants are held loosely in the apertures in a top plate while retained at the apertures in the bottom plate over air cells associated with and under the apertures in the bottom plate. The air cells provide a volume into which roots from the plug plant may grow, and the air cells have at least one port for drainage and/or ventilation and toward which roots are guided to be air pruned. The propagation tray maximizes air flow around the plug for air pruning of roots, while minimizing contact of the plug with the structures on the tray to reduce the formation of root defects.

18 Claims, 21 Drawing Sheets

(56) References Cited

U.S. PATENT DOCUMENTS

| | | | |
|---|---|---|---|
| 4,513,533 A | 4/1985 | Gething et al. | |
| 4,658,542 A | 4/1987 | Holmberg | |
| 7,681,357 B2 | 3/2010 | Dyas | |
| 8,261,488 B2 | 9/2012 | Kempf | |
| 8,443,548 B2 | 5/2013 | Kempf | |
| 9,265,201 B2 | 2/2016 | Blackmore, Jr. | |
| 9,706,718 B1* | 7/2017 | McMillan | A01G 9/086 |
| 2008/0078119 A1* | 4/2008 | Hansen | A01G 9/0293 47/66.5 |
| 2012/0186151 A1 | 7/2012 | Daas et al. | |
| 2013/0104454 A1 | 5/2013 | Deppermann et al. | |
| 2013/0160362 A1 | 6/2013 | Daas et al. | |

FOREIGN PATENT DOCUMENTS

| | | | |
|---|---|---|---|
| FR | 2050570 A5 * | 4/1971 | A01G 9/0295 |
| FR | 2639508 A1 * | 6/1990 | A01G 9/0297 |
| WO | 2010/052472 A1 | 5/2010 | |

OTHER PUBLICATIONS

International Search Report and Written Opinion dated Aug. 15, 2017 on PCT/CA2017/050547.

Product sheet for Ellepot Standard Trays & Propagation from Blackmore Company printed Mar. 3, 2016.

Google search results for test tube racks printed Feb. 24, 2016.

Product sheet for Pioneer Pot from Pioneer Pot company printed Mar. 3, 2016.

Product information for Ellepot tray from Proptek company printed Mar. 3, 2016.

Product information for plant pots from RJE Distributions printed Mar. 3, 2016.

* cited by examiner

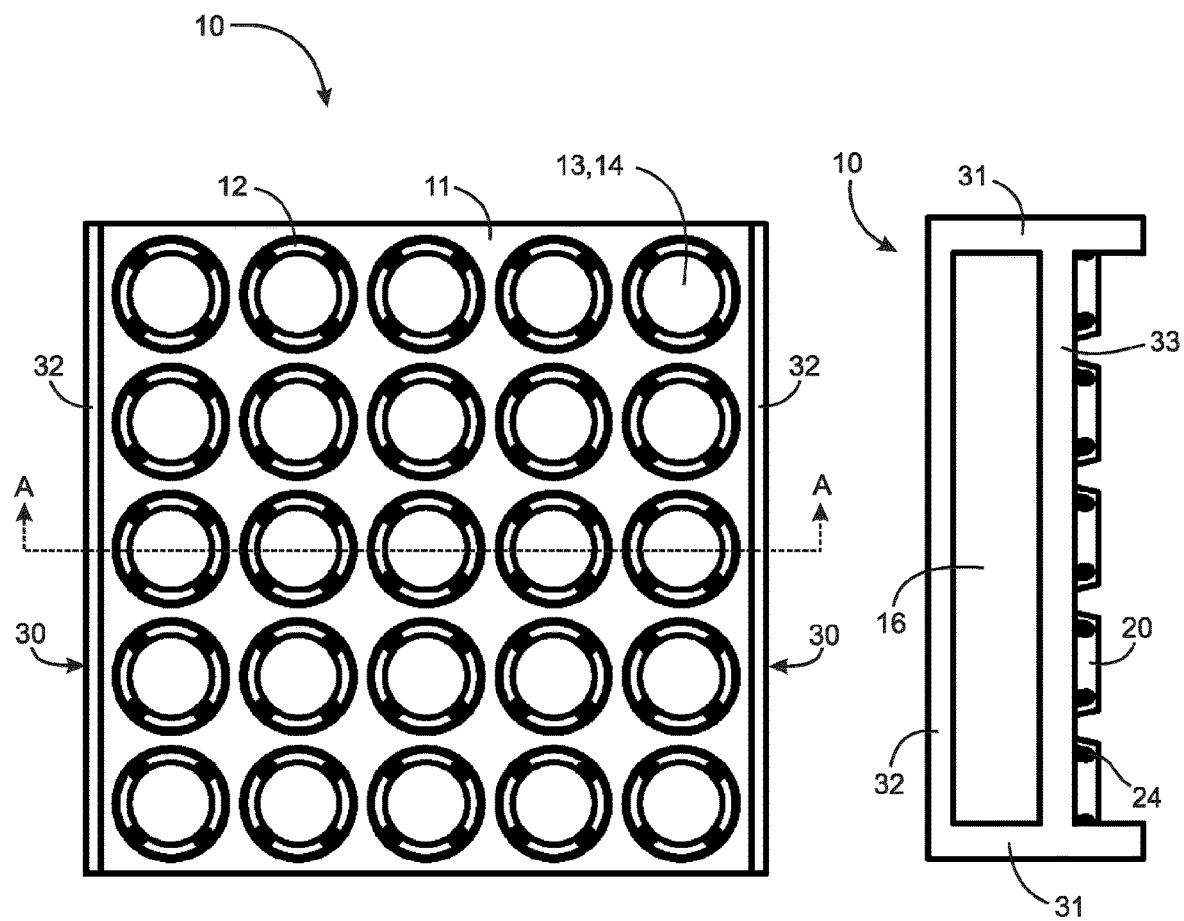
Fig. 1B
Fig. 1D
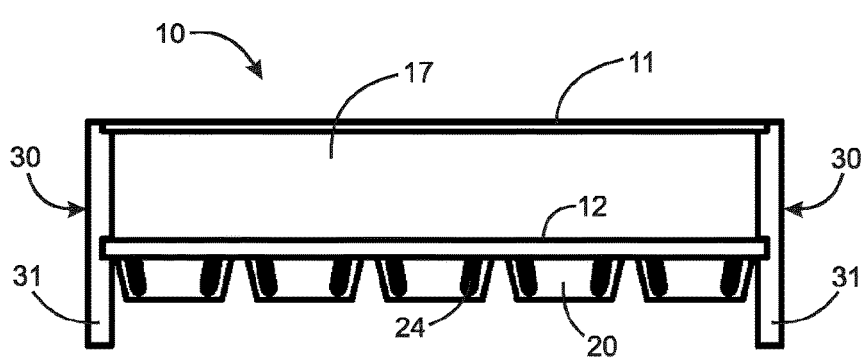
Fig. 1C

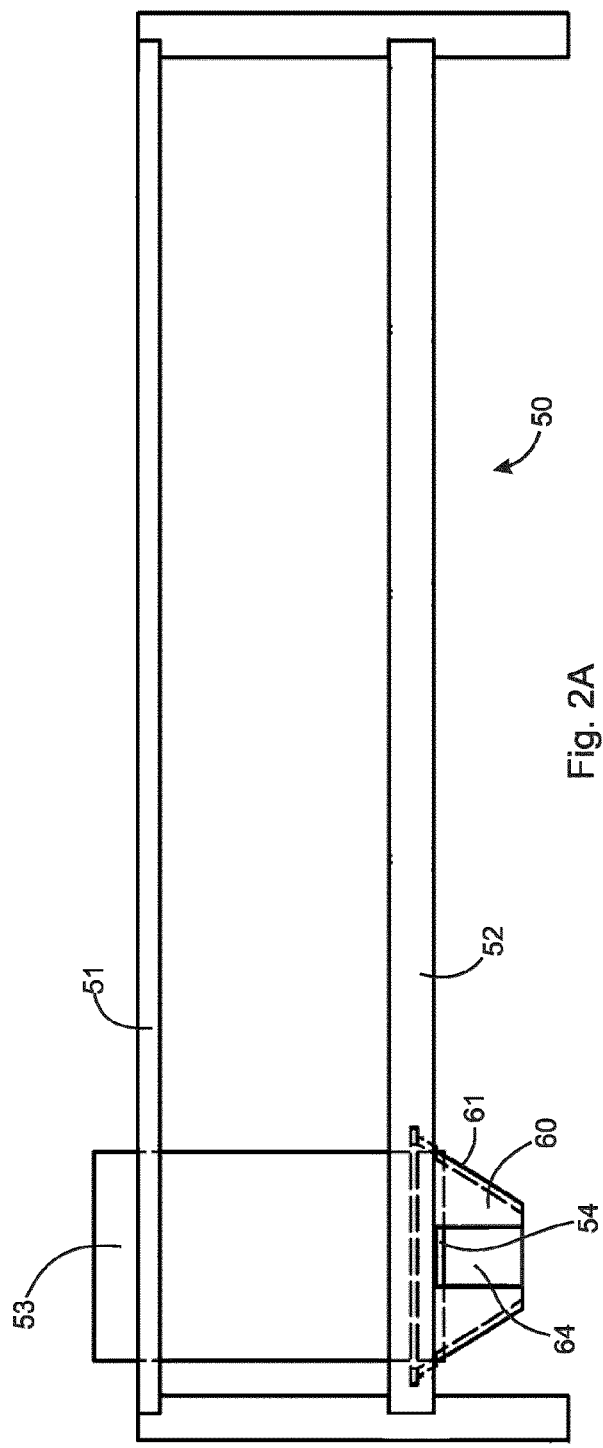
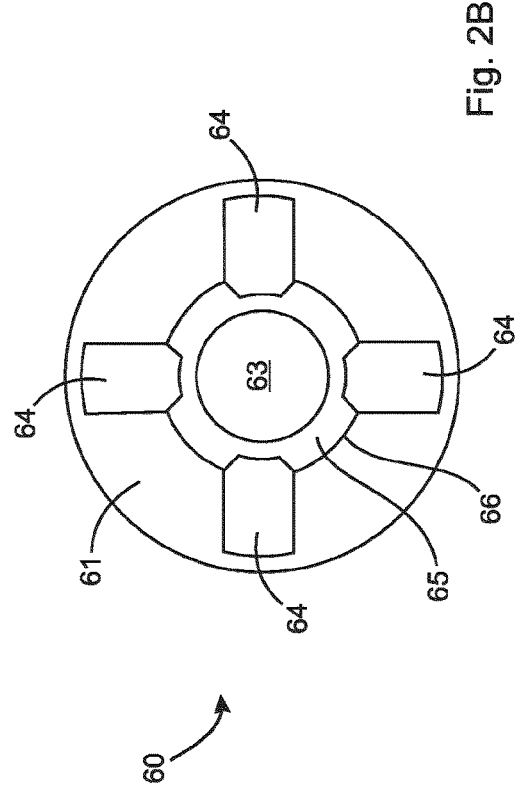
Fig. 2A
Fig. 2B

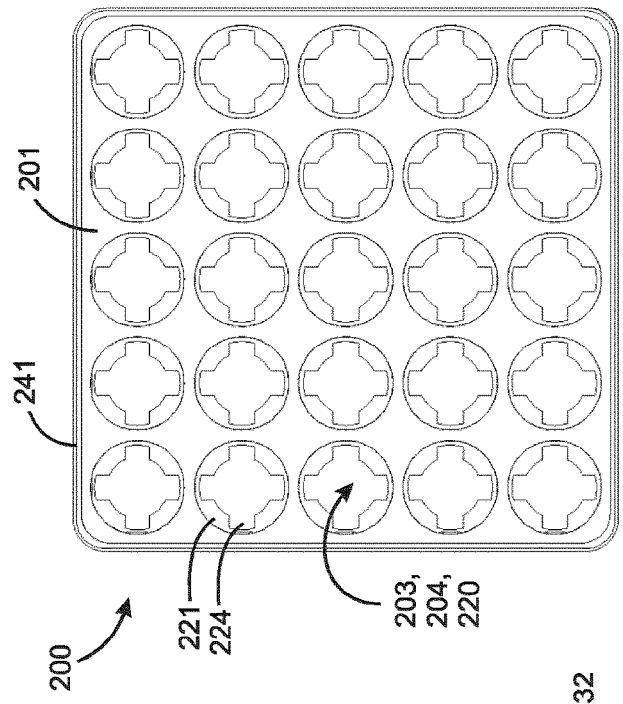
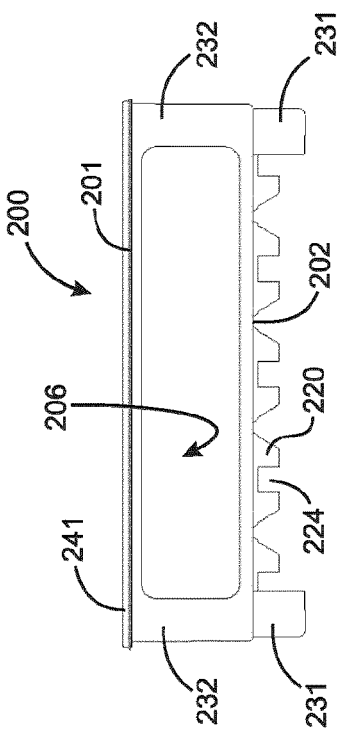
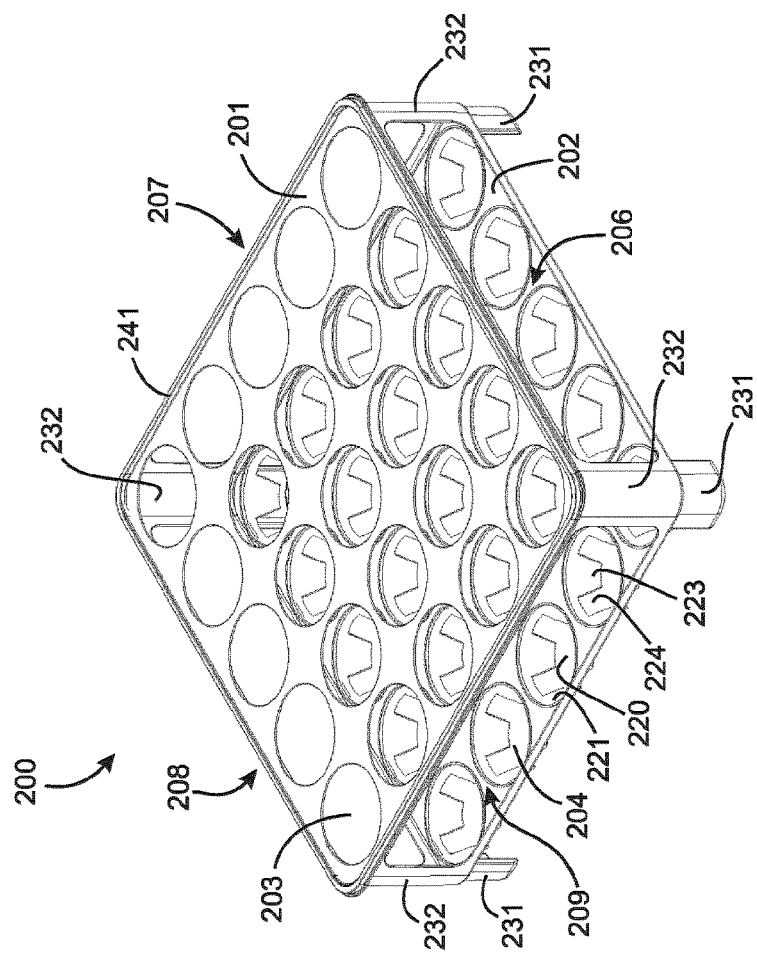

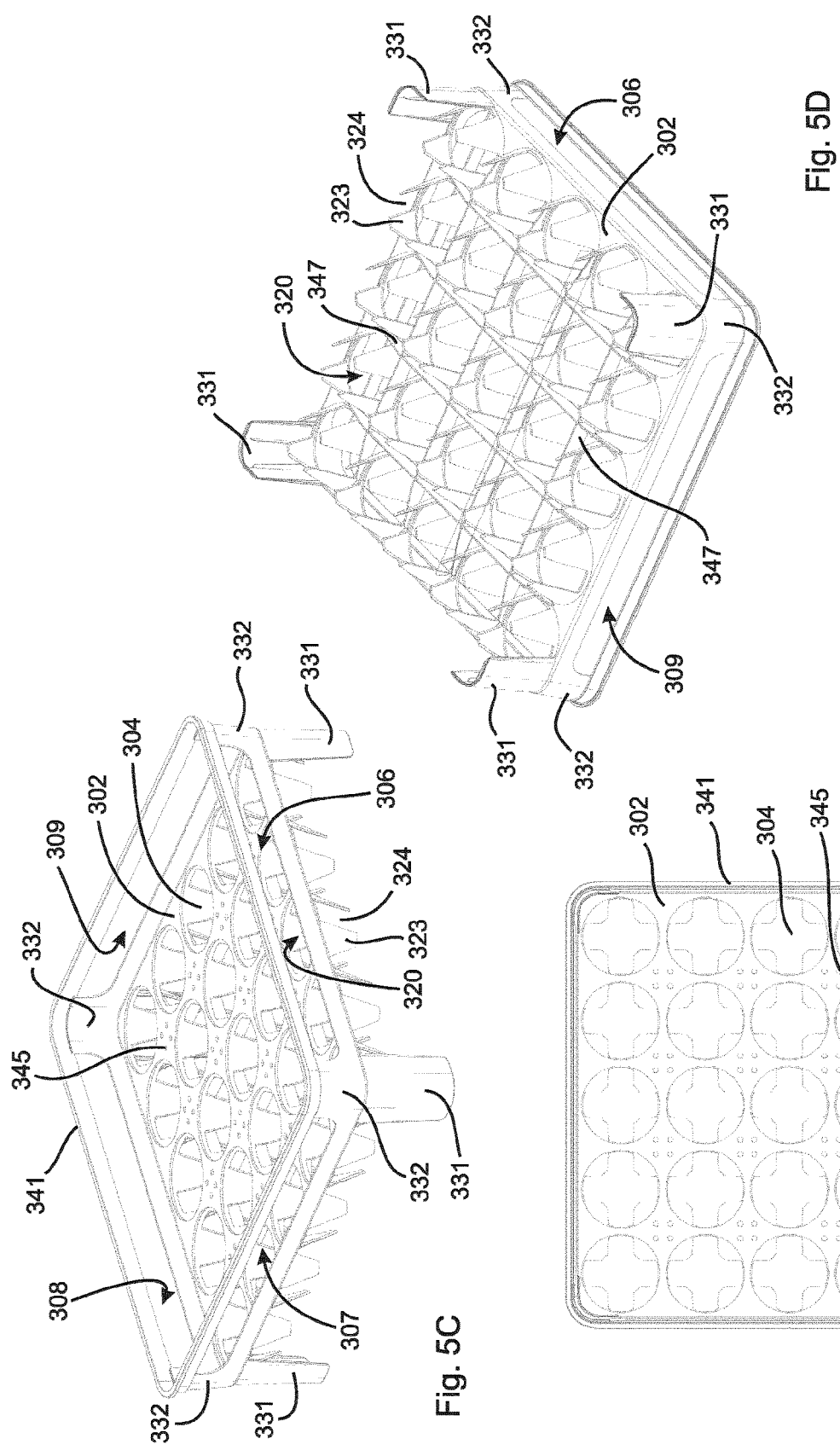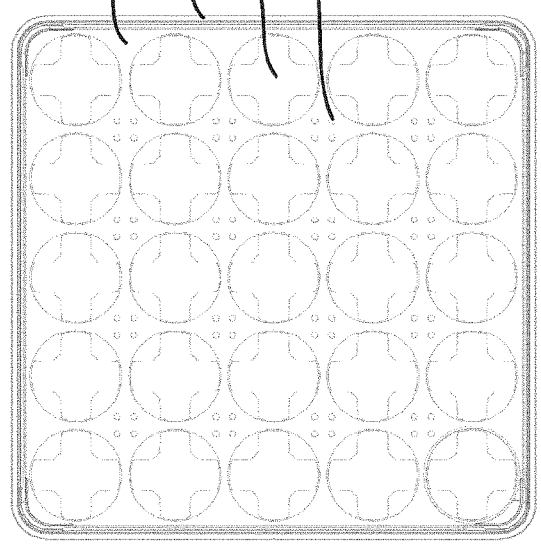

AIR-ROOT PRUNING PROPAGATION TRAY

CROSS-REFERENCE TO RELATED APPLICATIONS

This application is a national entry of International Application PCT/CA2017/050547 filed May 4, 2017, which claims the benefit of United States Provisional Patent Application U.S. Ser. No. 62/333,971 filed May 10, 2016, the entire contents of both of which are herein incorporated by reference.

FIELD

This application relates to horticulture and forestry, particularly to apparatuses for cultivating plants, especially to propagation trays, preferably for woody perennials.

BACKGROUND

Plug plants in horticulture are small-sized seedlings raised in growth media in small, individual containment units and ready to be transplanted into larger containers, a nursery field, a landscape or a garden. Plug plants are typically raised in controlled conditions during their important formative period (the first 4-6 weeks) to help ensure plant health and for the plants to reach their maximum potential during the harvest/blooming period. Propagation trays having a plurality of containment units are generally used to raise a plurality of plug plants for convenience of storage and transport. Plug plants are used for commercially raising vegetables, bedding plants, trees and the like.

Improper propagation tray design can significantly alter root formation of plants, especially of woody perennials, leading to substantial deformation, which is challenging and expensive to correct during later stages of production often resulting in malformed root balls. Root deformation to the structural roots of trees makes them less robust after transplanting, increasing tree mortality because roots are not placed advantageously for survival and establishment. Additionally, kinked, deformed and/or deep roots make trees susceptible to weather events posing serious safety risks, which is a major concern for urban forestry and park managers in cities around the world. Root defects generally occur when the design of the container or propagation tray inhibits the lateral roots from extending horizontally, forcing the roots to either circle within the container or grow vertically down to the bottom. Unfortunately, root deformation is common in plug-grown seedlings and if not corrected through mechanical remediation before out-planting, can contribute to long-term tree growth problems in the landscape.

Currently there are three main ways to manage root deformation: mechanical remediation (manual pruning), chemical pruning, and air-root pruning.

Mechanical remediation of circling roots at transplanting has become a recommended practice; however, root pruning to correct root malformation can cause transplant shock during field establishment. Root shaving (i.e. shaving off outer few inches of a root ball to remove circling roots) has been introduced as a method of correcting root malformations; however, at the propagation and liner stages it is extremely time consuming and labor intensive, and is therefore cost prohibitive. Additionally, mechanical pruning can result in human error (missing deformed roots in the interior of the ball) and removing mostly young active roots that are useful in helping trees become established.

Chemical pruning typically involves using containers coated with cupric carbonate, copper hydroxide or cupric sulfide to manage root development (copper salts in a latex carrier). This method has had widespread use in forestry (e.g. pretreated Styrofoam™) since the 1960's. As roots develop in the container and then reach the container wall, the chemical coating kills the root tips. Originally the product was delivered in the form of a user-applied coating, which producers found effective but inconvenient and labor-intensive. Now, a pretreated product line is available. Not all species respond the same to the treated pots and a proper application rate of the treatment is important to avoid excess root control and nutrient imbalance (i.e. copper-induced chlorosis). Nutrient uptake imbalances are particularly prevalent in containers with a high ratio of container surface area to substrate volume, such as propagation trays. Plants can also become stunted if they are left too long in the containers before shifting. Additionally, some growers are reluctant to use the product because of perceived environmental effects. Also, longevity of the coating is questionable and the coatings are expensive. Copper-treated trays do not have drainage holes so plugs can become waterlogged and aeration is reduced.

Air-root pruning involves desiccation of the root tips on exposure to air resulting in a loss of root apical dominance and the development of more fine roots. Many specialized container types have been designed to use air-root pruning involving specialized container shapes, bottomless containers, woven or non-woven fabrics, mechanical deflection or chemicals to control root growth. Air-root pruning technology has also been combined with mechanical deflection by including vertical ribs on the interior or exterior of (interior grooves) container surfaces.

In one example of an air-root pruning container, root growth and development is managed using a porous walled container, which stops root growth at the wall-substrate interface. As the roots grow towards the container walls the openings expose the substrate and consequently the root tips to air and the tips are desiccated (air pruning). As a result of the desiccated tips, branching occurs behind the root tip causing more fine roots to develop in the inner part of the root ball which allows for a more even root distribution and root systems to develop. However, at the larger sizes of nursery stock for which these porous-walled containers are created, the containers do not correct the malformed roots that develop in the propagation stage and manifest as permanent defects to structural roots as a result of the imprinting of the propagation plug cell on the root structure during early development.

Various other air-root pruning trays that exist on the market today have features that result in malformed roots. Even trays that are designed to air-root prune plugs to avoid circling roots still have structures that allow for root "trapping" and deflections mainly because plastic structures featured on the trays come into contact with the growing medium and roots become trapped by the vertical/horizontal ribbing or grooves and are redirected. Propagation trays on the market today having a typical range of soil volume for propagation (105 $cm^3$ to 547.52 $cm^3$) and have structures making significant contact with the plug will result in root malformation. Even trays having strategically placed holes with the objective of creating non-circling roots will still cause descending roots and therefore still result in malformed root architecture.

There remains a need for improved propagation trays to reduce the incidence of deformed roots during propagation.

SUMMARY

It has now been found that propagation trays having larger containment unit volumes and higher degrees of root exposure to air result in a greater amount of growth and a lower amount of root defects, i.e. large-volume propagation trays create taller plants with larger stem diameters, and higher degrees of air exposure cause desiccation to the root tips resulting in a loss of root apical dominance and the development of more fine roots. The present invention provides a propagation tray that minimizes contact of the tray with plug plants grown in bounded transplantable growing media while maximizing the degree of air exposure to the roots.

Thus, in one aspect of the present invention, there is provided a propagation tray for growing a plurality of plug plants in bounded transplantable growing media, the tray comprising: a top plate and a bottom plate spaced apart to provide a gap between the top and bottom plates, the top plate comprising a first array of apertures configured to receive therethrough plants in bounded transplantable growing media and to limit lateral movement of the bounded transplantable growing media in the first array of apertures, the bottom plate comprising a second array of apertures corresponding to the first array of apertures, the second array of apertures configured to retain the bounded transplantable growing media at the bottom plate proximate a bottom of the bounded transplantable growing media; a plurality of air cells associated with and disposed below the second array of apertures, the bounded transplantable growing media retained at the bottom plate substantially above the air cells, each air cell comprising a wall structure defining a volume of the air cell, the wall structure comprising at least one port configured to permit drainage of water from the air cell and/or ventilation of the air cell, the air cell configured to guide root growth toward the at least one port; and, at least one support configured to support the tray on a surface while providing a gap between the surface and bottoms of the wall structures of the air cells.

When used in conjunction with plug plants growing in bounded transplantable growing media, the propagation tray of the present invention increases plant growth, limits root defects (e.g. circling, girdling, kinked or descending roots) and encourages the development of more fine, fibrous roots in comparison to prior art propagation trays.

Bounded transplantable growing medium comprises a plug of growing medium (e.g. soil, peat, compost, fertilizer, polymer particles or any mixture thereof) contained within a porous wrapping material. The wrapping material is sufficiently porous to permit water to drain out of the growing medium. The wrapping material is sufficiently penetrable to permit root penetration through the wrapping material. The wrapping material is preferably biodegradable. Some examples of the wrapping material include, but are not limited to, cellulose, peat, nylon or a breathable non-slip cotton fabric (e.g. Jiffy Grip™). Bounded transplantable growing medium replaces traditional plastic, clay or metal containers and reduces plant damage, which occurs when pulling the plants from the containers. Plants grown in bounded transplantable growing medium are also easy to establish because air pruned roots immediately root out when planted. With such an undisturbed root ball, there is little or no transplant shock. In addition, there is a reduction in labor costs because the tasks of pulling plants out of containers and cleaning the containers are eliminated. Preferably, the bounded transplantable growing medium is an EllePot™, which replaces traditional containers with a biodegradable cellulose wrapper and features soy-based fertilizer.

The propagation tray is preferably used for one propagation cycle, although the tray may be used for more than one propagation cycle if desired. The propagation tray advantageously maximizes air exposure and profitability while managing seedling dry-out through design of the bounded transplantable growing medium. The propagation tray maximizes airflow around the bounded transplantable growing medium to allow root pruning to occur by minimizing contact between the tray and the surface of the bounded transplantable growing medium. The tray may be in contact with the bounded transplantable growing medium in an amount of about 18% or less, even 16% or less, even 10% or less, even 5% or less, even 3% or less, or even 1% or less, of the surface area of the bounded transplantable growing medium, for example in a range of about 5-18% or about 10-16% or about 2-10% or about 3-10%. The propagation tray does not require mechanical deflections for the plug, for example vertical or horizontal ribs (interior protrusions in the container) or grooves (interior channels) are not needed. The bounded transplantable growing medium is "free floating" contained loosely by the apertures in the top plate and retained at the apertures in the bottom plate substantially above the air cells with minimal contact with the bottom plate. Such a design does not encourage descending or circling roots. Rather, roots gather in the air cells where they are air pruned at the at least one port, because the bounded transplantable growing media supported substantially above the air cells and roots growing out of the bounded transplantable growing media have substantially little or no contact with the walls of the air cells.

The top plate comprises a first array of apertures, i.e. top apertures. The top apertures are configured to receive therethrough the plants in bounded transplantable growing media. The bounded transplantable growing media is loosely contained within the top apertures, the top apertures limiting lateral movement of the bounded transplantable growing media to prevent the bounded transplantable growing media from toppling over. However, the bounded transplantable growing media is readily insertable in and removable from the top apertures when loading and unloading the tray. Because the top apertures provide for tolerances between the top apertures and the bounded transplantable growing media therein, and the top plate is relatively thin (e.g. about 1-2 mm), the bounded transplantable growing media makes very little contact with the top plate. Reducing the contact between the top plate and the bounded transplantable growing media maximizes air exposure to the roots.

The top apertures may be of any suitable shape and size to accommodate the type of bounded transplantable growing media. Some suitable shapes include, for example, circular, ellipsoidal, polygonal (e.g. triangular, square, rectangular, pentagonal, hexagonal), irregular or some combination thereof. In one embodiment where the EllePot™ is the intended bounded transplantable growing medium, the top apertures are preferably circular with a diameter between 60 mm and 68 mm, more preferably between 62 mm and 66 mm; however, a different diameter and growing medium volume may be chosen to accommodate different designs of the propagation tray.

The bottom plate comprises a second array of apertures, i.e. bottom apertures. The second array of apertures corresponds to the first array of apertures, acting in conjunction with the first array of apertures to retain the bounded transplantable growing media in the tray. The second array of apertures is configured to retain the bounded transplantable growing media at the bottom plate proximate a bottom of the bounded transplantable growing media. The bottom of the bounded transplantable growing media may rest on the bottom plate at the bottom apertures and/or some, i.e. a small amount, of the bounded transplantable growing media may protrude through the bottom apertures into the air cells to be supported on the wall structures of the air cells to help support and stabilize the bounded transplantable growing media in the tray. Thus, while the bounded transplantable growing media is retained at the bottom plate, the transplantable growing media may be supported on the bottom plate or on the wall structures of the air cells below the bottom plate. However, most of the bounded transplantable growing media is above the second array of apertures and therefore above the air cells to maximize air exposure to the roots. Preferably, the bounded transplantable growing media protrudes through the bottom apertures by an amount that is no more than about 40% of a height of the bounded transplantable growing media, more preferably no more than about 37%. The amount the bounded transplantable growing media protrudes through the bottom apertures may be in a range of about 25-33% of the height of the bounded transplantable growing media.

The second array of apertures may be of any suitable shape and size to accommodate the type of bounded transplantable growing media. Suitable shapes include those described above in connection with the first array of apertures. The sizes of the bottom apertures may be the same or different sizes than the sizes of the top apertures. The bottom apertures preferably have a size and shape which are close to the cross-sectional size and shape of the bottom of the bounded transplantable growing media. In one embodiment, the sizes of the bottom apertures are the same as the sizes of the top apertures. In another embodiment, the sizes of the bottom apertures are smaller than the sizes of the top apertures. In another embodiment, the sizes of the bottom apertures are larger than the sizes of the top apertures.

Like the top plate, the bottom plate is preferably relatively thin, preferably having about the same thickness as the top plate. Thin plates reduce weight of the tray for easier handling. A thin bottom plate also provides for more volume of air between adjacent air cells under the bottom plate.

To act in conjunction with the top apertures to retain the bounded transplantable growing media in the tray, the bottom apertures are preferably aligned with the top apertures. More preferably, the bottom and top apertures are concentric. Further, the numbers of apertures in the first and second arrays of apertures are not particularly limited. Preferably, there are at least two apertures in the top plate and two corresponding apertures in the bottom plate. Smaller trays with fewer apertures are easier to handle but more trays would be required for large growing operations. Larger trays with more apertures can handle more plant plugs requiring fewer trays, but may become too heavy and unwieldy.

The top and bottom plates may be independently any desired size and/or shape. The shape may be, for example, circular, ellipsoidal polygonal (e.g. triangular, square, rectangular, pentagonal, hexagonal), irregular or some combination thereof. The plates are preferably rectangular or square. The plates are preferably the same shape. The plates are preferably the same size.

The top and bottom plates are spaced apart a sufficient distance so that the bounded transplantable growing media is retained at the bottom plate while being contained within the first array of apertures of the top plate. The actual spacing may depend on the type and/or size of the bounded transplantable growing media. Preferably, the top and bottom plates are spaced apart so that a top of the bounded transplantable growing media protrudes above the first array of apertures. However, the top and bottom plates may be spaced apart just enough so that a top of the bounded transplantable growing media protrudes only slightly above the first array of apertures. Where the EllePot™ (having a diameter of about 60 mm and a height of about 100 mm for a volume of about 283 cm$^3$) is the intended bounded transplantable growing medium, the top and bottom plates are preferably spaced apart by an amount in a range of about 25 mm to about 95 mm. In some embodiments, the amount may be in a range of about 65 mm to about 95 mm, preferably about 65 mm to about 85 mm, more preferably about 70 mm to about 80 mm, for example about 75 mm. In other embodiments, the amount may be in a range of about 25 mm to about 65 mm, preferably about 40 mm to about 60 mm, more preferably about 45 mm to about 55 mm, for example about 50 mm. The desired spacing between the top and bottom plates may depend on the needs and/or desires of the grower.

To minimize weight of the tray, maximize air flow around the bounded transplantable growing media and encourage horizontal root growth, the top and bottom plates are preferably not connected by walls. Preferably, one or more struts connect the top plate to the bottom plate. The gap between the top and bottom plates may be substantially unbounded. Thus, the tray may comprise sides that are substantially open, for example at least about 30% open, or even at least about 35% open, or even at least about 40% open, or at least about 90% open, or even at least about 95% open, to air flow and horizontal root growth. Desirably, no portions of the sides, for example no portions of the struts, are in contact with the bounded transplantable growing media. The substantially open sides are preferably substantially free of tray structures, except in some embodiments at a periphery of the plates. The one or more struts may be located anywhere on the plates or around a periphery of the plates. In one embodiment, for a rectangular or square tray comprising rectangular or square plates, there are preferably four struts connecting the two plates located at or proximate corners of the plates. In other embodiments, further struts may be situated in the sides between the corners of the rectangular or square plates, for example four more struts each situated on a side about mid-way between the corners.

A plurality of air cells is associated with and disposed below the second array of apertures. Preferably, the tray comprises one air cell per aperture of the second array of apertures. In one embodiment, the bounded transplantable growing media are retained at the bottom plate substantially above the air cells, although a small amount of the bounded transplantable growing media may extend into the air cells through the second array of apertures. In another embodiment, the bounded transplantable growing media may extend significantly into the air cells so that the bottoms of the bounded transplantable growing media are supported on the wall structures of the air cells and the bounded transplantable growing media are loosely retained in the second array of apertures. by the bottom plate.

Each air cell comprises a wall structure defining a volume of the air cell. The wall structure need not be continuous around the volume of the air cell. The air cells provide a volume beneath the bounded transplantable growing media into which roots growing out the bottom of the bounded transplantable growing media may grow and collect in a controlled manner. The wall structure preferably has an interior surface that is smooth, without any ribs or grooves. The wall structure comprises at least one port configured to permit drainage of water from the air cell and/or ventilation of the air cell. The at least one port is an opening for the passage of liquid or gas. The opening may be bounded on all sides by the wall structure, or may have one or more sides unbounded by the wall structure. The air cell is configured to guide root growth toward at least one port. Ports may have any shape, for example, circular, ellipsoidal polygonal (e.g. triangular, square, rectangular, pentagonal, hexagonal), irregular, open-edged or some combination thereof. Ports may be of any size that suitably permits drainage, ventilation and/or air pruning of roots.

The at least one port preferably comprises an open bottom or an opening in the bottom of the air cell. The air cell is preferably configured to direct root growth toward the port in the bottom of the air cell where the roots are air pruned.

The at least one port may comprise one or more side ports in one or more sides of the wall structure of the air cell to permit drainage, ventilation and air pruning. Preferably, the one or more side ports comprises a plurality of side ports, for example 2, 3, 4, 5 or more side ports. In one embodiment, the wall structure of the air cell comprises an opening in the bottom of the air cell and at least one vertical open-edged side port. In one embodiment, the open-edged side port may comprise a slot extending to the bottom of the wall structure so that there is no bottom edge to the side port. In one embodiment, where the at least one open-edged side port comprises a plurality of open-edged side ports, the bottom of the wall structure may comprise a plurality of prongs forming the side ports therebetween, the prongs joined at the opening in the bottom of the air cell. In one embodiment, where the at least one open-edged side port comprises a plurality of open-edged side ports, the air cell may comprise an open bottom in which case the bottom of the wall structure may comprise a plurality of prongs forming the side ports therebetween, the prongs not joined at the bottom of the air cell. In one embodiment, there are four equidistant side ports in the air cell. It has been found that the combined size of the side ports has an important contribution to proper air pruning. Preferably, the side ports have a combined total size in a range of about 25% to about 45% of total surface area of the sides of the wall structure.

The air cells may have any suitable size and shape that reduces negative impacts on root development and growth. Some shapes include, for example, conical, hemispherical, truncated polyhedral, and the like. Certain shapes contribute to proper root development and growth significantly more than others. The air cells are preferably conical frustums having opposed circular or ellipsoidal faces, preferably opposed circular faces, in which the larger diameter faces are located at tops of the frustums where the air cells are associated with the second array of apertures of the bottom plate. The air cells comprising wall structures in the shape of conical frustums have interior angles of decline between the larger diameter faces and the smaller diameter faces. It has been found that the interior angle of decline has an important contribution to directing roots toward the at least one port for air pruning. Preferably, the interior angle of decline is in a range of about 100° to about 130°, more preferably about 110° to about 130°. The preferred size of the air cells is somewhat dependent on the size of the bounded transplantable growing media. Where the EllePot™ (having a volume of about 283 cm$^3$) is the intended bounded transplantable growing medium, the air cells may have, in one embodiment, a depth in a range of about 13 mm to about 35 mm or about 13 mm to about 27 mm, for example about 20 mm, or, in another embodiment, a depth in a range of about 30 mm to about 44 mm, for example about 37 mm.

The air cells may be attached to the bottom plate below the second array of apertures. The air cells may be unitized with or separable from bottom plate. Preferably, the air cells are unitized with the bottom plate to reduce production costs, to reduce the number of separate parts and to reduce any seams that may provide roots with the opportunity to develop and grow in an undesired manner.

The propagation tray comprises at least one support configured to support the tray on a surface while providing a gap between the surface and bottoms of the wall structures of the air cells. There should be a sufficient number of supports to support the tray, while minimizing blockage of air flow under the bottom plate and air cells. The supports permit air movement to occur around the air cells to permit air pruning of roots that grow into the air cells. Thus, the gap between the surface and bottoms of the wall structures of the air cells may be substantially unbounded. In one embodiment, the supports may raise the bottom plate above the surface by a distance in a range of about 20 mm to about 45 mm. In another embodiment, the supports may raise the bottom plate above the surface by a distance in a range of about 45 mm to about 80 mm, preferably a range of about 65 mm to about 75 mm, for example about 69 mm. In one embodiment, the supports may raise the bottom plate above the surface to provide a gap of about 10 mm to about 20 mm between the surface and the bottom of the air cells. In another embodiment, the supports may raise the bottom plate above the surface to provide a gap between the surface and the bottom of the air cells of about 20 mm to about 50 mm, preferably about 25 mm to about 40 mm, for example about 32 mm. The supports may be separate structures from the struts connecting the top plate to the bottom plate, or one or more of the supports may be the same structure as one or more of the struts. In one embodiment where the tray is rectangular or square, the tray preferably comprises four supports, one at or proximate each corner of the tray. For larger trays, one or more supports may be included proximate a center of the tray and/or the supports may be connected by a base or elongated lower connecting elements to strengthen and stabilize the tray. The base or elongated lower connecting elements may be connected to the bottom plate in spaced apart relation.

The propagation tray may be unitized as a single non-separable structure or may be separable into two or more parts. In one embodiment, the top plate is inseparable from the bottom plate. In one embodiment, the top plate is separable from the bottom plate. In one embodiment, the bottom plate, air cells, supports and struts form a single monolithic structure. In one embodiment, the top plate is hinged proximate a side of the top plate. The tray may comprise any combination of such embodiments.

Where the top plate is separable from the bottom plate, the top plate may be assembled with the bottom plate in any suitable manner. In one embodiment, the top and bottom plates may comprise one or more mated protrusions and indentations to provide a snap fit. Before assembly, the top plate and bottom plate may be nested with other top plates and bottom plates, respectively, for convenience in stacking and shipping of the trays. Where the top plate is separable from the bottom plate, or the top plate is hinged on a side, the tray is advantageously easier to unload because separating the top plate from the bottom plate or swinging the top plate on the hinge at the end of a propagation cycle provides a grower with clear access to the plugs. Removing the plugs from the tray is therefore easier and results in less root damage.

The propagation tray may be constructed of any suitable material, for example plastic, wood, steel and the like. Preferably, the propagation tray is constructed of a plastic, preferable a low density plastic (to reduce weight) that is sufficiently rigid not to bend or collapse under the weight of the bounded transplantable growing media. The propagation tray may be constructed using any method. Thermoforming molding may be particularly advantageous when using plastics because thermoforming molding is low cost and can readily produce monolithic structures in large quantities. However, injection molding or other molding processes may be used.

The plants may be any plants that are amenable to plugs, for example, vegetables, bedding plants (e.g. flowers), woody perennials (e.g. trees and shrubs) and the like. Plugs of woody perennials are especially benefited from the propagation tray. Woody perennials include, for example, shrubs and trees having woody stems. Some particular examples of woody perennials are ornamental trees, shade trees, specimen trees, trees for reforestation efforts and fruit trees, e.g. species from the families Aceraceae, Sapindaceae, Betulaceae, Rosaceae, Juglandaceae, Ulmaceae, Cornaceae, Fabaceae, Malvaceae, Bignoniaceae, Salicaceae, Fagaceae, Oleaceae, Tiliaceae, Pinaceae and Cupressaceae. In one embodiment, the propagation tray is especially designed to improve the development of woody perennial root structures during propagation and limit root defects (e.g. circling, girdling, kinked or descending roots).

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 1B is a top view of the propagation tray of FIG. 1A;

FIG. 1C is an end view of the propagation tray of FIG. 1A;

FIG. 1D is a side view of the propagation tray of FIG. 1A;

FIG. 2A is a side view of a second embodiment of a propagation tray, which is the same as the propagation tray of FIG. 1A except that each air cell comprises open-edged side ports connected at a port in a bottom of the air cell;

FIG. 2B is a bottom view of an air cell of the propagation tray of FIG. 2A;

FIG. 4A is an isometric view of a fourth embodiment of a propagation tray in accordance with the present invention;

FIG. 4B is a top view of the propagation tray of FIG. 4A;

FIG. 4C is a side view of the propagation tray of FIG. 4A;

FIG. 5C is a top isometric view of the propagation tray of FIG. 5A without a top plate;

FIG. 5D is a bottom isometric view of the propagation tray of FIG. 5A without a top plate;

FIG. 5E is a top view of the propagation tray of FIG. 5A without a top plate;

DETAILED DESCRIPTION

Figure 1A:
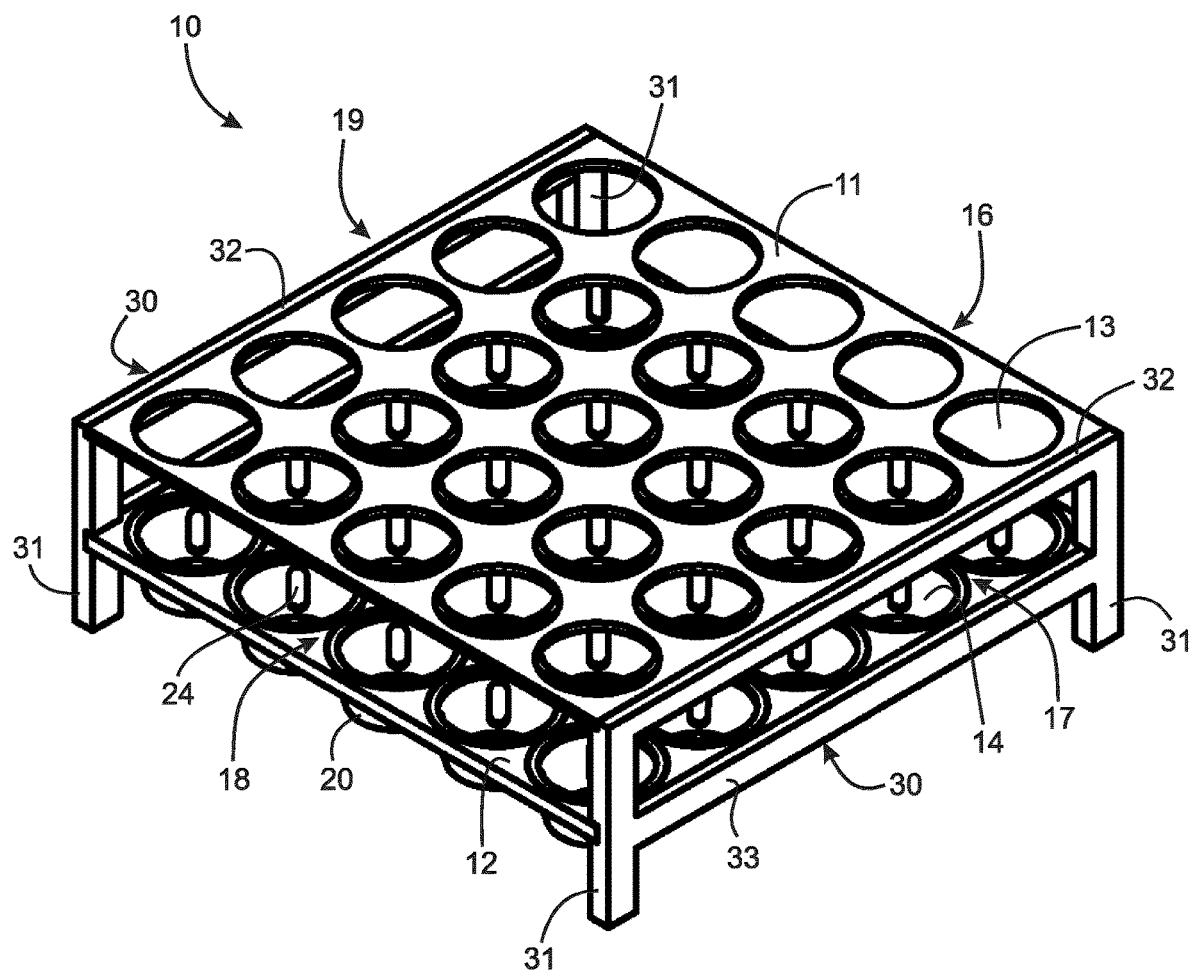
FIG. 1A is an isometric view of a first embodiment of a propagation tray in accordance with the present invention.

With reference to FIG. 1A, FIG. 1B, FIG. 1C, FIG. 1D, FIG. 1E, FIG. 1F and FIG. 1G, a first embodiment of a propagation tray 10 comprises a top plate 11 vertically spaced apart from a bottom plate 12, the top plate 11 comprising a first 5×5 array of 25 apertures 13 (only one labeled) concentrically aligned with a second 5×5 array of 25 apertures 14 (only one labeled) in the bottom plate 12. The apertures 13 may have larger diameters than the apertures 14, which can be seen in FIG. 1B illustrating the concentric apertures 13, 14 as viewed from the top of the tray 10, although in other embodiments the apertures 13, 14 may have the same diameters. Some of the bottom plate 12 may be seen through the apertures 13 in the top plate when viewed directly from above. The top and bottom plates 11, 12 are spaced apart by a sufficient distance that EllePots™ (not shown) inserted though the apertures 13 in the top plate 11 are loosely held within the apertures 13 while being retained proximate bottoms of the EllePots™ in the apertures 14. Small amounts of the EllePots™ extend through the apertures 14 so that the bottoms of the EllePots™ are supported on inner surfaces of walls 21 of frustoconical air cells 20 (only one labeled) associated with and disposed below the apertures 14. The air cells 20 may be integrally formed with the bottom plate 12, for example by thermoforming the apertures 14 together with the air cells 20 into a sheet of plastic.

The top and bottom plates 11, 12 are held spaced apart by a pair of leg assembles 30 at opposite sides of the tray 10. Each of the leg assemblies 30 comprise a pair of vertically oriented legs 31 located at corners of the tray 10 and connected together by upper and lower horizontally extending elongated frame elements 32, 33, respectively. Opposed sides of the bottom plate 12 are supported by the leg assemblies 31 in dado joints in the lower frame elements 33, while the top plate 11 resting on the upper frame elements 32 is connected to a top portion of the leg assemblies 31.

Figure 1E:
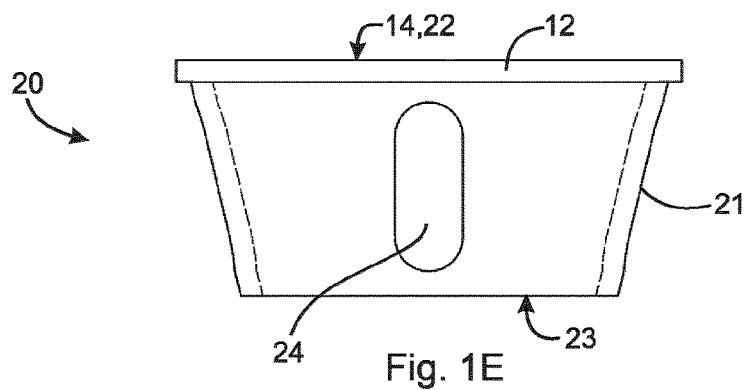
FIG. 1E is a magnified side view of an air cell of the propagation tray of FIG. 1A.
Figure 1F:
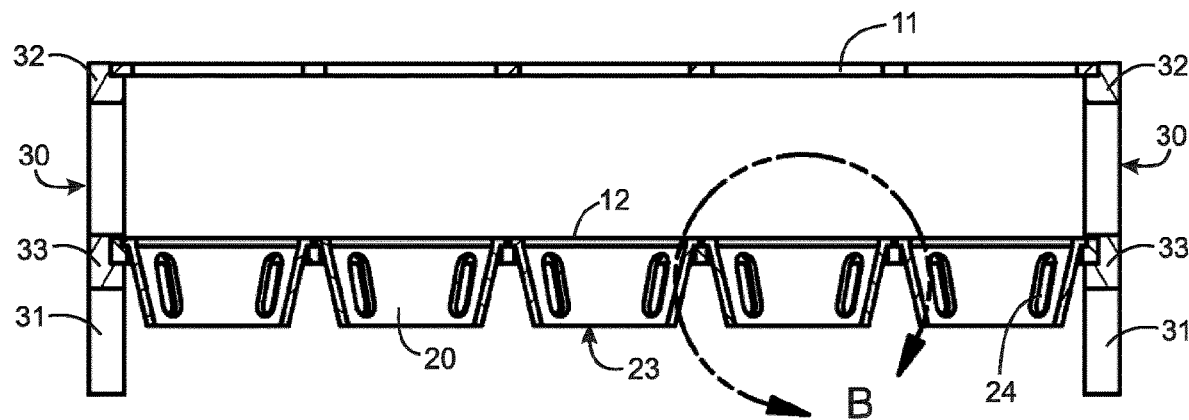
FIG. 1F is a sectional view through A-A in FIG. 1B.
Figure 1G:
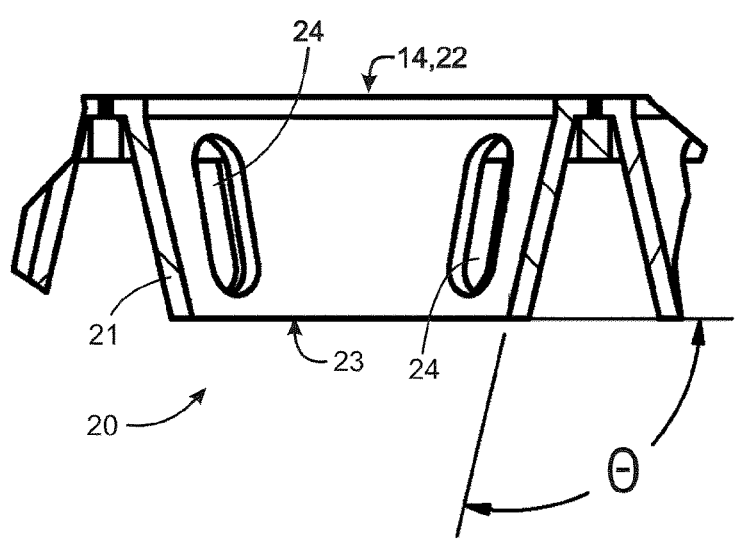
FIG. 1G is a magnified view of detail B in FIG. 1F.
Figure 3A:
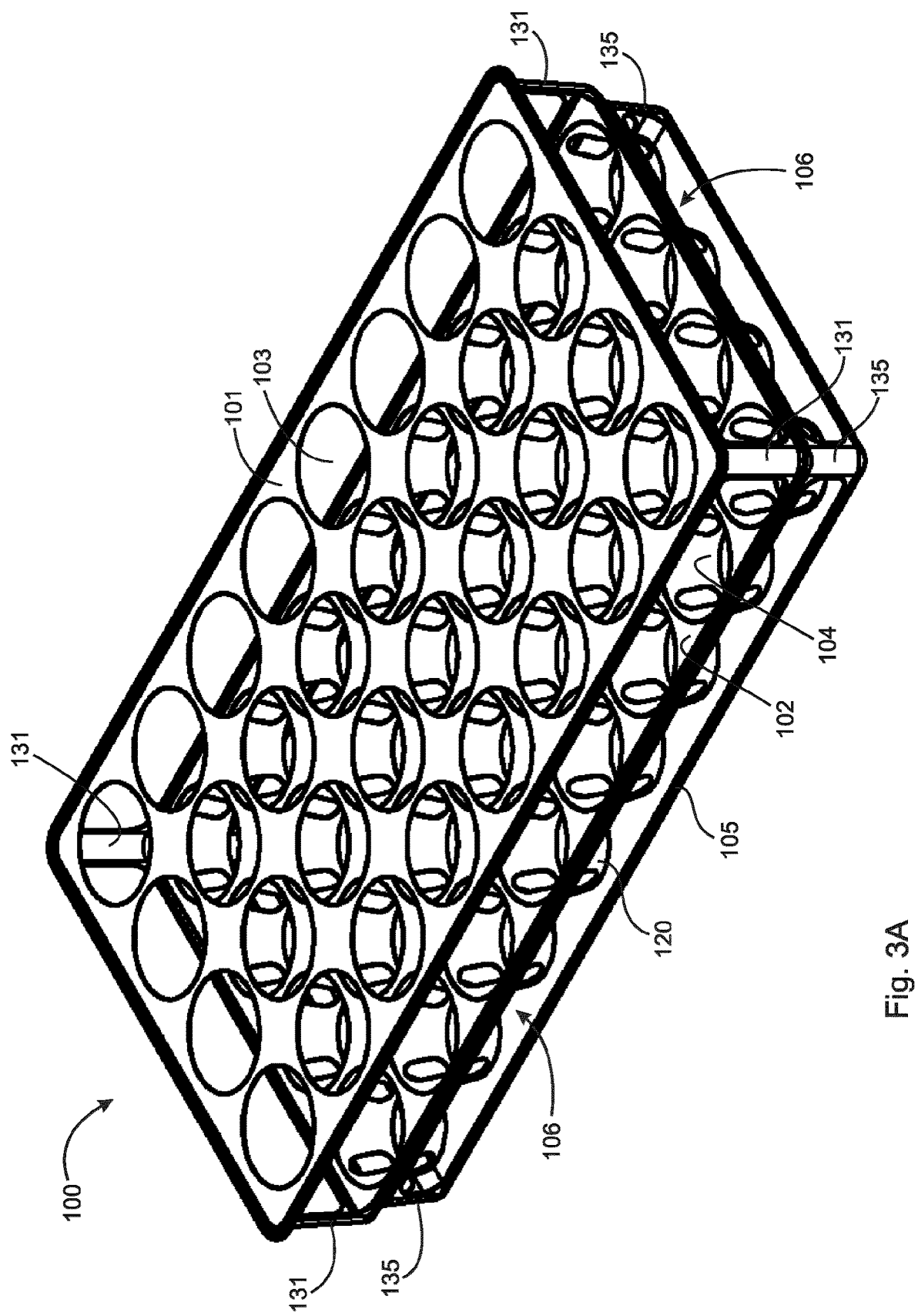
FIG. 3A is an isometric view of a third embodiment of a propagation tray in accordance with the present invention.
Figure 3B:
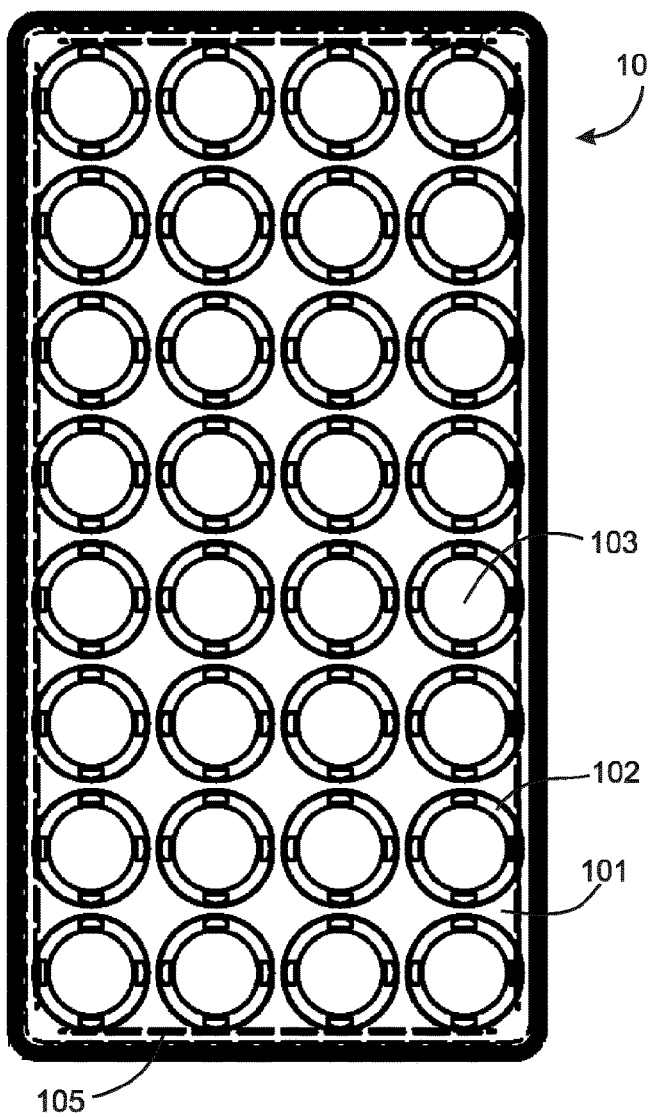
FIG. 3B is a top view of the propagation tray of FIG. 3A.
Figure 3D:
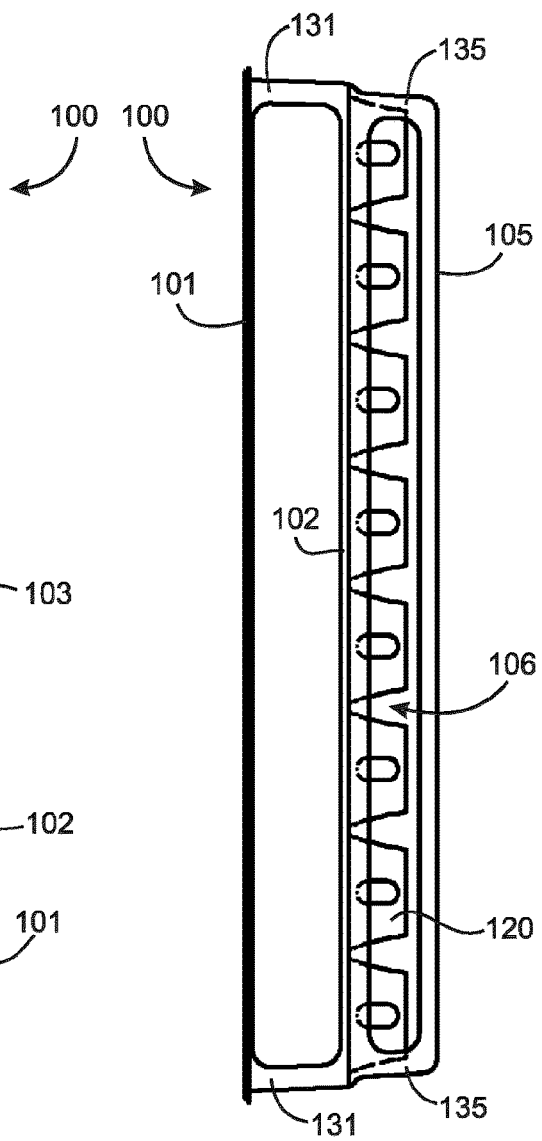
FIG. 3D is a side view of the propagation tray of FIG. 3A.
Figure 3C:
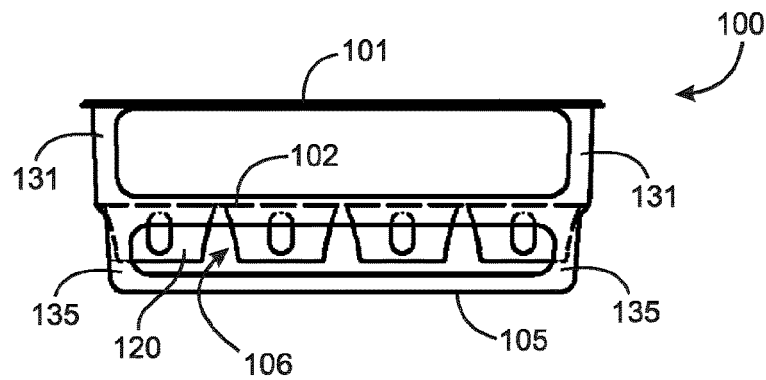
FIG. 3C is an end view of the propagation tray of FIG. 3A.

As illustrated best in FIG. 1E and FIG. 1G, each of the air cells 20 comprise a frustoconical wall 21, an open top 22, and an open bottom 23, the open bottom 23 acting as a port through which water may drain and the air cell 20 may be ventilated, and at which roots growing out of the EllePots™ into the air cell 20 may be air pruned. To efficiently guide roots toward the open bottom 23, the frustoconical wall 21 has an interior angle of decline of e, which may be in a range of about 110° to about 130°, as illustrated in FIG. 1G. The frustoconical wall 21 also comprises four equidistantly-spaced oblong side ports 24, through which water may drain and the air cell 20 may be ventilated, and at which roots growing out of the EllePots™ into the air cell 20 may be air pruned.

The propagation tray 10 comprises four substantially open sides 16, 17, 18, 19, which provide virtually uninhibited air flow among the EllePots™ throughout the tray 20. Less than about 10%, for example about 2-10%, of the surface area of the EllePots™ is in contact with the tray 20 providing roots with the opportunity to grow substantially without defects caused by tray structure, and providing maximal air contact for air-root pruning of roots growing out of the EllePots™.

With reference to FIG. 2A and FIG. 2B, a second embodiment of a propagation tray 50 is the same as the propagation tray of FIG. 1A, except that frustoconical air cells 60 (only one shown) each comprise four open-edged generally rectangular side ports 64 (only one shown in FIG. 2A) equidistantly located around a frustoconical side wall 61 of the air cell 60 and connected at a bottom wall 65 surrounding a bottom port 63 of the air cell 60. The four side ports 64 wrap around a bottom edge 66 of the air cell 60 to also form ports in the bottom wall 65 of the air cell 60. A top plate 51 and a bottom plate 52 are spaced apart by a sufficient distance that EllePots™ 53 (only one shown) inserted though top apertures in the top plate 51 are loosely held within top apertures while being retained proximate bottoms of the EllePots™ 53 in corresponding bottom apertures in the bottom plate 52. Small amounts 54 of the EllePots™ 53 extend through the bottom apertures so that the bottoms of the EllePots™ 53 are supported on inner surfaces of the side walls 61 of the frustoconical air cells 60 associated with and disposed below the bottom apertures.

With reference to FIG. 3A, FIG. 3B, FIG. 3C and FIG. 3D, a third embodiment of a propagation tray 100 comprises a rectangular top plate 101 vertically spaced apart from a rectangular bottom plate 102, the top plate 101 comprising a first 8×4 array of 32 apertures 103 (only one labeled) concentrically aligned with a second 8×4 array of 32 apertures 104 (only one labeled) in the bottom plate 102. Design of the plates 101, 102, the apertures 103, 104 and air cells 120 (only one labeled) are otherwise the same as in the propagation tray 10 described above, except for the way in which the tray 100 and the plates 101, 102 are supported. In the tray 100, the top and bottom plates 101, 102 are connected to each other at four corners by four struts 131, which are part of the same monolithic molded piece of material of which the bottom plate 102 is made. The top plate 101 is removably fitted, for example snap fitted, on to the struts 131 at a top of the struts 131. The bottom plate 102 is supported on a rectangular base 105 formed of four walls joined at corners 135, the base 105 and the bottom plate 102 formed in the same monolithic molded piece of material. The base 105 has a height sufficient to provide a suitable air space under the air cells 120 to permit drainage and air-root pruning at the bottoms of the air cells 120. The four walls of the base 105 each have single large apertures 106 so that at least 90% of the surface area of the four walls is open to permit air to flow freely under the bottom plate 102 and air cells 120. Likewise, at least 90% of the surface area of the sides of the tray 100 between the top plate 101 and the bottom plate 102 is open to permit air to flow freely in the gap between the plates 101, 102.

Figure 4D:
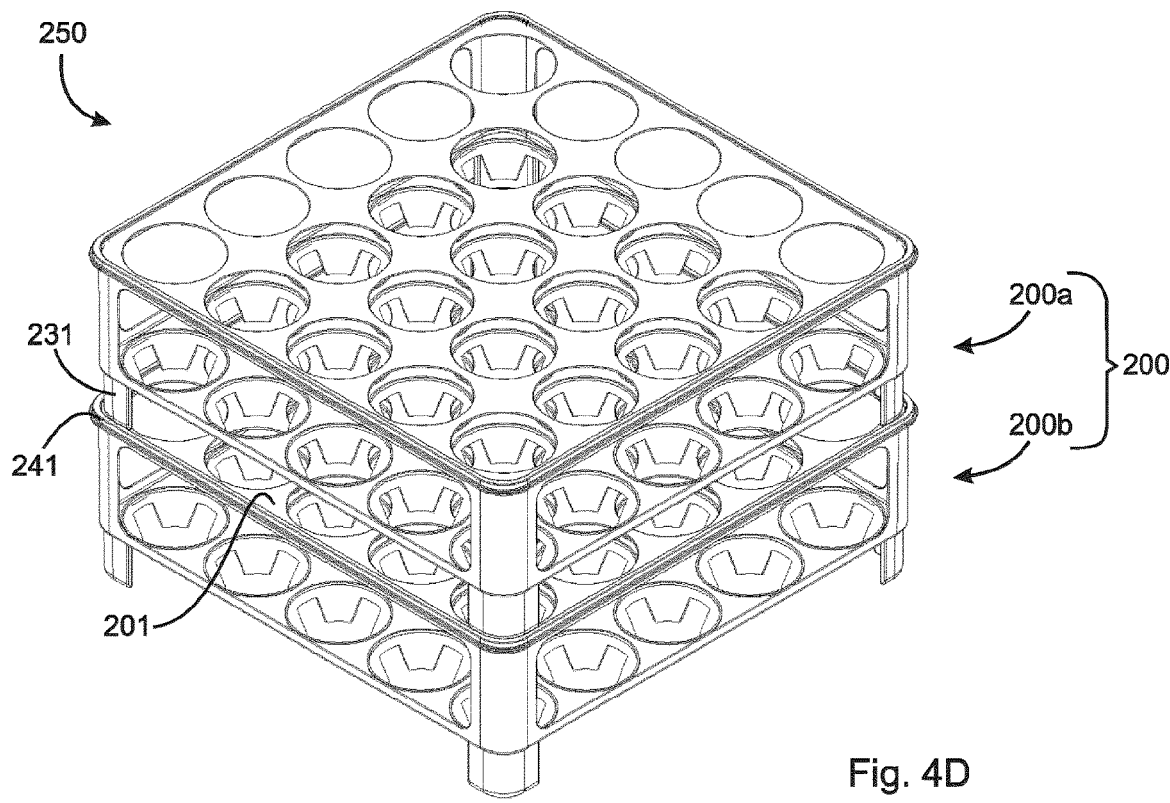
FIG. 4D is an isometric view of two propagation trays of FIG. 4A stacked together.

With reference to FIG. 4A, FIG. 4B, FIG. 4C, FIG. 4D and FIG. 4E, a fourth embodiment of a propagation tray 200 comprises a single molded monolithic piece of plastic. The propagation tray 200 comprises a substantially square top plate 201 vertically spaced apart from a substantially square bottom plate 202 by four struts 232, one strut 232 at each corner of the propagation tray 200. The top plate 201 comprises a first 5×5 array of 25 apertures 203 (only one labeled) concentrically aligned with a second 5×5 array of 25 apertures 204 (only one labeled) in the bottom plate 202. The apertures 203 may have substantially the same diameters as the apertures 204, which can be seen in FIG. 4B illustrating the concentric apertures 203, 204 as viewed from the top of the tray 200.

The top and bottom plates 201, 202 are spaced apart by a sufficient distance that EllePots™ (not shown) inserted though the apertures 203 in the top plate 201 are loosely held within the apertures 203 while being loosely retained proximate bottoms of the EllePots™ in the apertures 204. Small amounts of the EllePots™ extend through the apertures 204 so that the bottoms of the EllePots™ are supported on inner surfaces of frustoconical walls 221 of frustoconical air cells 220 (only one labeled) associated with and disposed below the apertures 204.

The frustoconical air cell 220 comprises the wall 221, an open top, and an open bottom, the open bottom acting as a port through which water may drain and the air cell 220 may be ventilated, and at which roots growing out of the EllePots™ into the air cell 220 may be air pruned. The wall 221 also comprises four equidistantly-spaced open-edged side ports 224 (only one labelled) through which water may drain and the air cell 220 may be ventilated, and at which roots growing out of the EllePots™ into the air cell 220 may be air pruned. The four side ports 224 in a given air cell 220 are open spaces between four tab-like bottom portions 223 (only one labelled) of the wall 221, bottom edges of the four tab-like bottom portions 223 being unattached to each other by virtue of the bottom of the air cell 220 being open.

The propagation tray 200 comprises four legs 231 depending downwardly from the four corners of the bottom plate 202. The legs 231 support the propagation tray 200 on a surface such that the bottoms of the air cells 220 are raised sufficiently above the surface to permit virtually uninhibited air flow beneath the air cells 220. The propagation tray 200 further comprises four substantially open sides 206, 207, 208, 209, which provide virtually uninhibited air flow among the EllePots™ throughout the tray 220. The open sides 206, 207, 208, 209 are spaces defined by outer edges of the top and bottom plates 201, 202 and the struts 232. Less than about 10%, for example about 2-10%, of the surface area of the EllePots™ is in contact with the tray 220 providing roots with the opportunity to grow substantially without defects caused by tray structure, and providing maximal air contact for air-root pruning of roots growing out of the EllePots™.

Figure 4E:
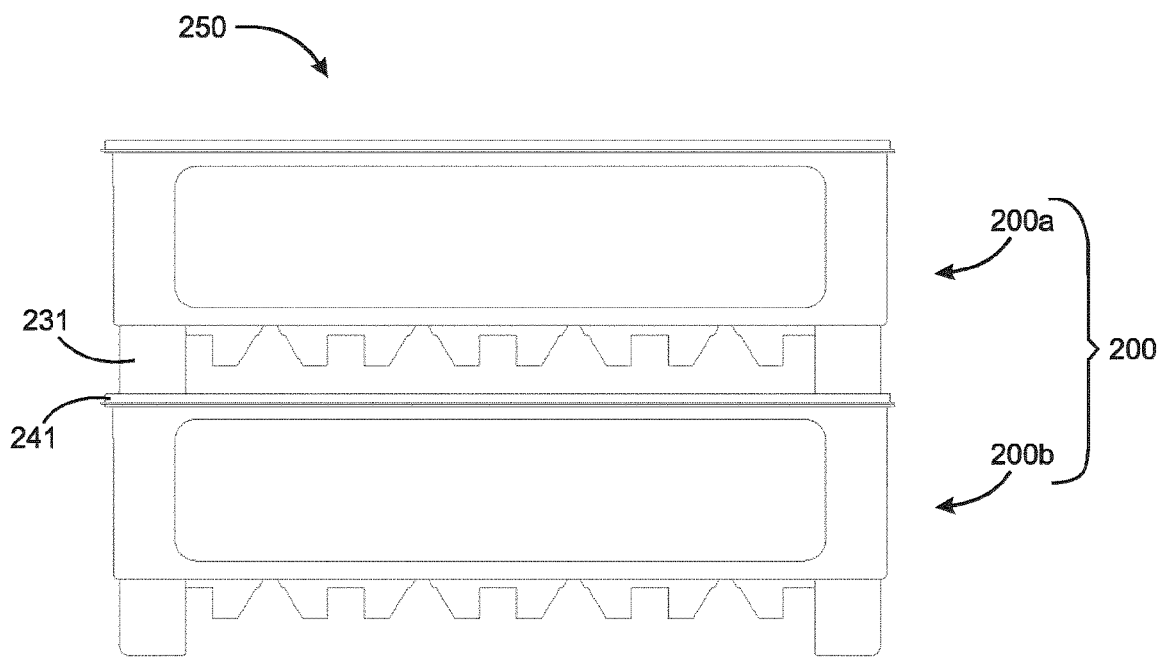
FIG. 4E is a side view of FIG. 4D.

With particular reference to FIG. 4D and FIG. 4E, the propagation tray 200 is designed to be stacked in a plurality of stacked propagation trays, which for simplicity is illustrated in FIG. 4D and FIG. 4E as a stack 250 of two propagation trays, an upper tray 200a and a lower tray 200b. To facilitate stacking, the top plate 201 of the propagation tray 200 may comprise a raised perimetrical upper edge 241 within which the legs 231 of another propagation tray may be contained. As shown in FIG. 4D and FIG. 4E, the legs 231 of the upper tray 200a are supported on the top plate 201 of the lower tray 200b inside the raised perimetrical upper edge 241 of the lower tray 200b to reduce the possibility of relative lateral movement between the upper and lower trays 200a, 200b. The legs 231 of the propagation tray 200 are offset inwardly from the open sides of the propagation tray 200. The inward offset permits the legs 231 of the upper tray 200a to rest on the top plate 201 of the lower tray 200b inside the perimetrical upper edge 241 of the lower tray 200b. The height of the perimetrical upper edge 241 may be sufficient to inhibit lateral movement of the upper tray 200a on the lower tray 200b to form a stable stack 250, while permitting the trays to be stacked and deliberately unstacked without undue difficulty.

With reference to FIG. 5A, FIG. 5B, FIG. 5C, FIG. 5D and FIG. 5E, a fifth embodiment of a propagation tray 300 comprises two molded pieces of plastic. One piece of the propagation tray 300 comprises a substantially square top plate 301. The other piece of the propagation tray 300 comprises a substantially square bottom plate 302 with four vertically extending struts 332, one strut 332 at each corner of the bottom plate 302. The struts 332 support a raised perimetrical upper edge 341 on which the top plate 301 may be supported to be vertically spaced apart from bottom plate 302. The top plate 301 comprises four inwardly extending raised lips 349 at each of the corners of the top plate 301, which provide raised surfaces on which a grower may conveniently grip the top plate 301 to lift the top plate 301 off the upper edge 341 or lower the top plate 301 on to the upper edge 341. In this manner, the top plate 301 may be separable from the bottom plate 302 to facilitate loading and unloading of EllePots™ (not shown) in the tray 300.

Figure 5A:
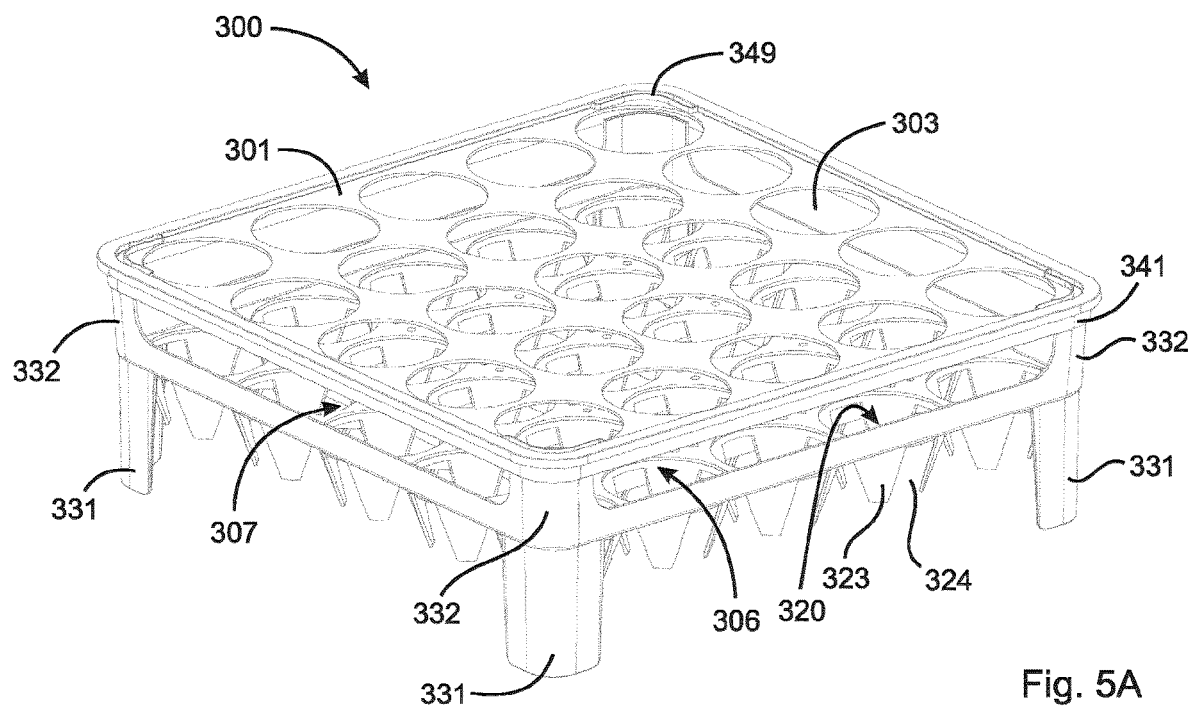
FIG. 5A is an isometric view of a fifth embodiment of a propagation tray in accordance with the present invention.
Figure 5B:
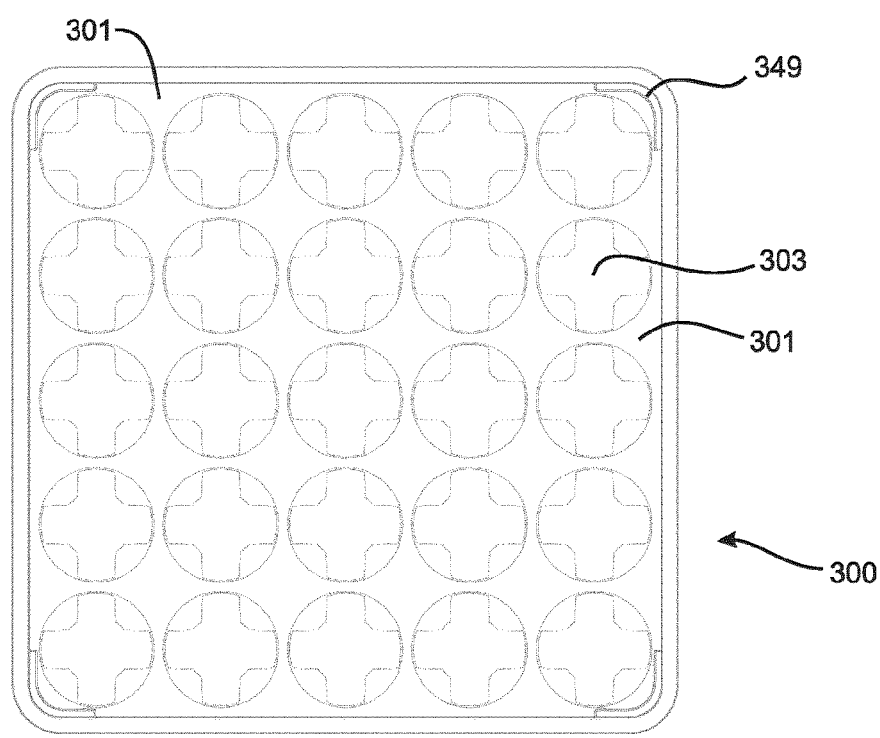
FIG. 5B is a top view of the propagation tray of FIG. 5A.

The top plate 301 comprises a first 5×5 array of 25 apertures 303 (only one labeled) concentrically aligned with a second 5×5 array of 25 apertures 304 (only one labeled) in the bottom plate 302 when the top plate 301 is supported on the upper edge 341. The apertures 303 may have substantially the same diameters as the apertures 304, which can be seen in FIG. 5B illustrating the concentric apertures 303, 304 as viewed from the top of the tray 300.

The top and bottom plates 301, 302 are spaced apart by a sufficient distance that EllePots™ inserted though the apertures 303 in the top plate 301 are loosely held within the apertures 303 while being loosely retained proximate bottoms of the EllePots™ in the apertures 304. Small amounts of the EllePots™ extend through the apertures 304 so that the bottoms of the EllePots™ are supported on inner surfaces of four downwardly extending tabs 323 (only one labeled) which form wall-like structures of frustoconical air cells 320 (only one labeled) associated with and disposed below the apertures 304.

The frustoconical air cell 320 comprises the tabs 323, an open top, and an open bottom, the open bottom acting as a port through which water may drain and the air cell 320 may be ventilated, and at which roots growing out of the EllePots™ into the air cell 320 may be air pruned. The four tabs 323 of one air cell 320 are separated by four equidistantly-spaced open-edged side ports 324 (only one labelled) through which water may drain and the air cell 320 may be ventilated, and at which roots growing out of the EllePots™ into the air cell 320 may be air pruned. The four side ports 324 in a given air cell 320 are open spaces between the four tabs 323, bottom edges of the four tabs 323 being unattached to each other by virtue of the bottom of the air cell 320 being open.

The propagation tray 300 comprises four legs 331 depending downwardly from the four corners of the bottom plate 302. The legs 331 support the propagation tray 300 on a surface such that the bottoms of the air cells 320 are raised sufficiently above the surface to permit virtually uninhibited air flow beneath the air cells 320. The propagation tray 300 further comprises four substantially open sides 306, 307, 308, 309, which provide virtually uninhibited air flow among the EllePots™ throughout the tray 320. The open sides 306, 307, 308, 309 are spaces defined by outer edge of the bottom plate 302, the perimetrical upper edge 341 and the struts 332. Less than about 18%, for example about 10-16%, of the surface area of the EllePots™ is in contact with the tray 320 providing roots with the opportunity to grow substantially without defects caused by tray structure, and providing maximal air contact for air-root pruning of roots growing out of the EllePots™.

The bottom plate 302 is further provided with irrigation holes 345 (only one labeled) situated between the apertures 304 holding the EllePots™, which permit drainage of water from through the bottom plate 302 to both irrigate the regions around air cells 320 and reduce pooling of water on the bottom plate 302. Furthermore, as best seen in FIG. 5D, an underside of the bottom plate 302 comprises integrally molded longitudinal and transverse ribs 347 (one longitudinal rib labeled and one transverse rib labeled) that provide structural strength to reduce deformation (e.g. bowing) of the bottom plate 302 due to the weight of the EllePots™. The ribs 347 are situated between the air cells 320 and have a sufficiently thin and narrow profile to prevent contact with or otherwise interfere with the air cells 320 or the EllePots™ in the air cells 320.

A plurality of propagation trays 300 may be stacked in a manner similar to the propagation tray 200 described above.

The effect of a propagation tray of the present invention (RootSmart™ Tray) on various growing parameters of various species of woody perennials was compared to the effect of commercially available propagations trays (Solid-walled Tray and Porous-walled Tray). FIG. 6, FIG. 7, FIG. 8, FIG. 9 and FIG. 10 are graphs depicting the results.

Figure 6A:
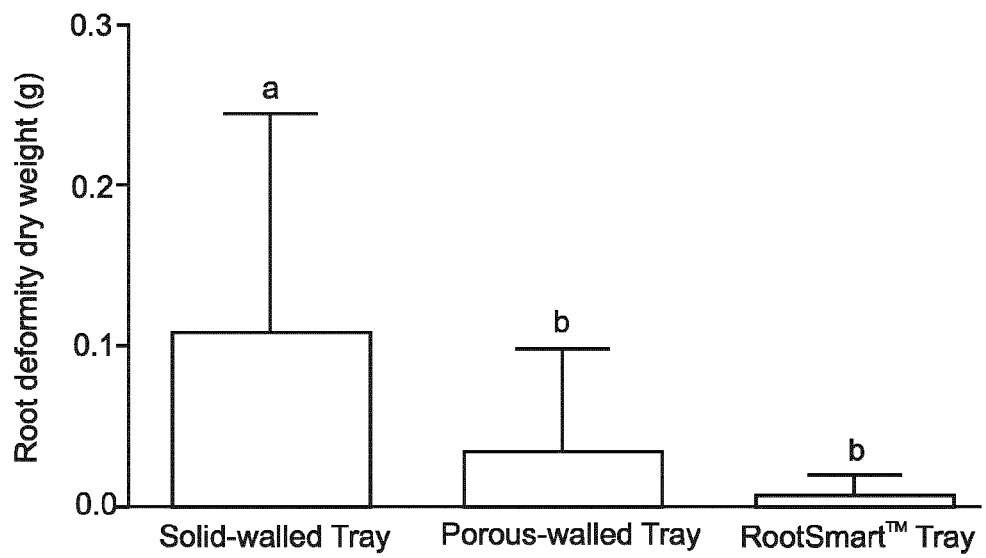
FIG. 6 depicts graphs showing effect of tray type on root deformity dry weight of quaking aspen (FIG. 6A) and red oak (FIG. 6B) grown in a propagation tray of the present invention (RootSmart™ Tray) and two prior art trays (Solid-walled Tray and Porous-walled Tray), where data means are ±SD (n=30) and bars bearing different letters are significantly different using Dunn's multiple comparisons test at $P<0.05$.
Figure 6B:
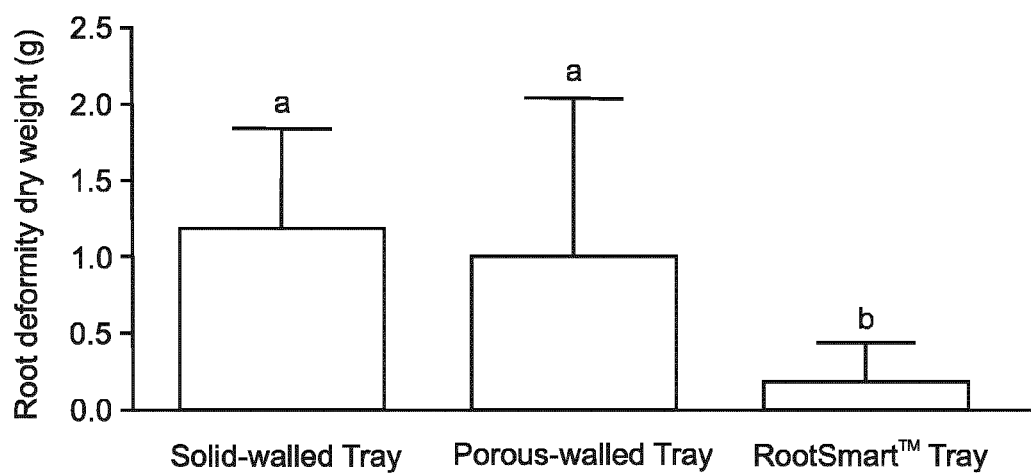
Figure 11:
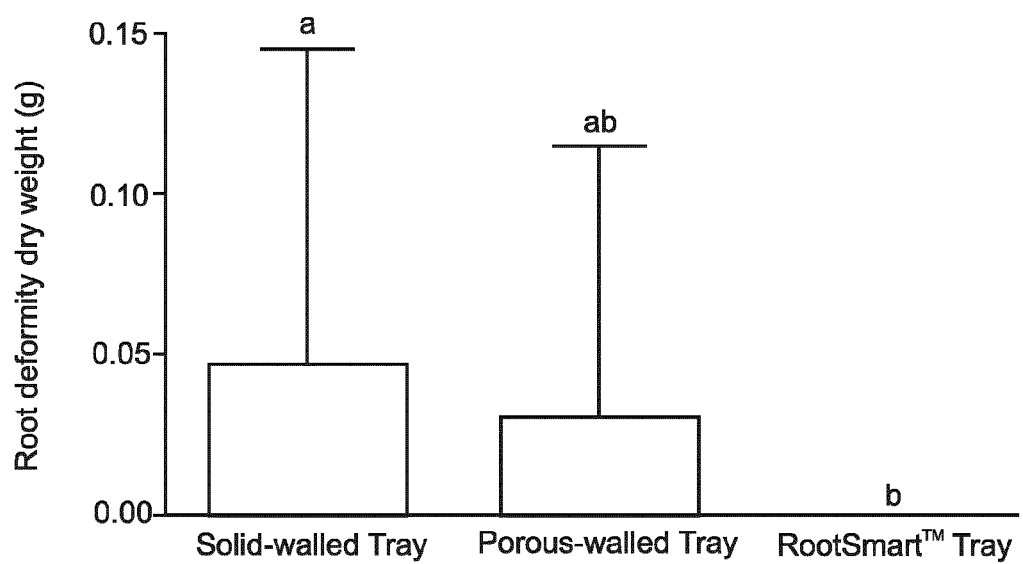
FIG. 11 depicts a graph showing effect of tray type on root deformity dry weight of red maple grown in a propagation tray of the present invention (RootSmart™ Tray) and two prior art trays (Solid-walled Tray and Porous-walled Tray), where data means are ±SD (n=28) and bars bearing different letters are significantly different using Dunn's multiple comparisons test at $P<0.05$.

FIG. 6A, FIG. 6B and FIG. 11 show the effect on root deformation. FIG. 6A, FIG. 6B and FIG. 11 reveal that the propagation tray of the present invention (RootSmart™ Tray) significantly reduces root deformities in three commercially relevant species that present production challenges, quaking aspen (*Populus tremuloides*), red oak (*Quercus rubra*) and red maple (*Acer rubrum*). The Solid-walled Tray possesses no air-root pruning features (i.e. the substrate is in direct contact with the cell walls on all sides), whereas the Porous-walled Tray is designed for minimal contact between the substrate and the container but has four vertical structures in the cells. With respect to the Porous-walled tray, where the vertical structures are present and the growing media makes contact with plastic of the tray, root deflections occur and root deformities develop. The root dry weights of the quaking aspen and red maple seedlings grown in the RootSmart™ Tray of the present invention were significantly less with respect to root deformations that developed than the root dry weight grown in the Solid-walled Tray. The root dry weight of the red oak seedlings grown in the RootSmart™ Tray of the present invention was significantly less with respect to root deformations that developed than the root dry weight grown in the Solid-walled Tray and the Porous-walled Tray.

Figure 7:
FIG. 7 is a graph showing effect of tray type on root dry weight (g) per total root length (cm) for quaking aspen grown in a propagation tray of the present invention (RootSmart™ Tray) and two prior art trays (Solid-walled Tray and Porous-walled Tray), where data means are ±SD (n=34) and bars bearing different letters are significantly different using Tukey's multiple comparisons test at $P<0.05$.
Figure 8A:
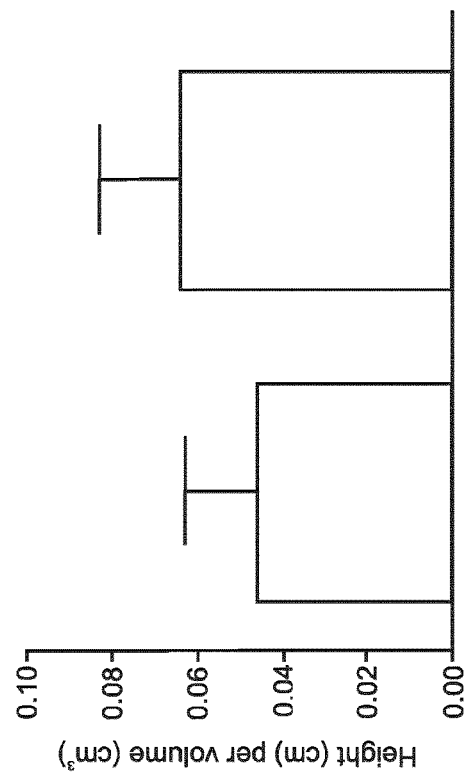
FIG. 8 depicts graphs showing effects of tray type on trunk cross sectional area (TCSA) (FIG. 8A), height (FIG. 8B), leaf dry weight (FIG. 8C) and leaf area per substrate volume (FIG. 8D) for red maple seedlings grown in a propagation tray of the present invention (RootSmart™ Tray) and a prior art tray (Porous-walled Tray), where data means are ±SE (n=30), illustrating that the RootSmart™ Tray produced seedlings with significantly greater TCSA and height at $P<0.05$.
Figure 8C:
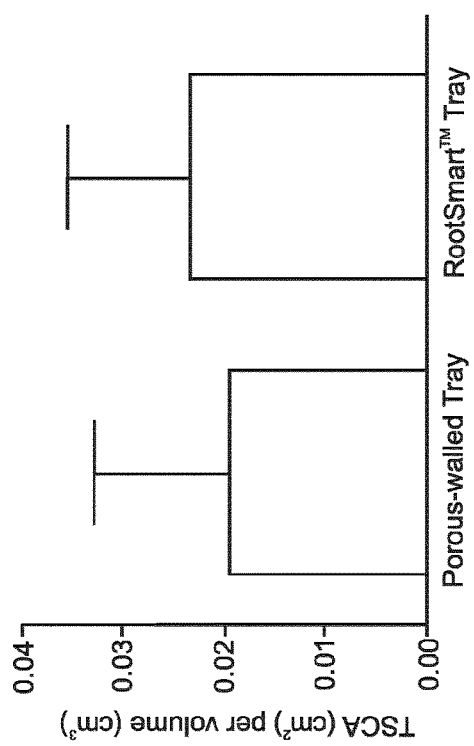
Figure 8B:
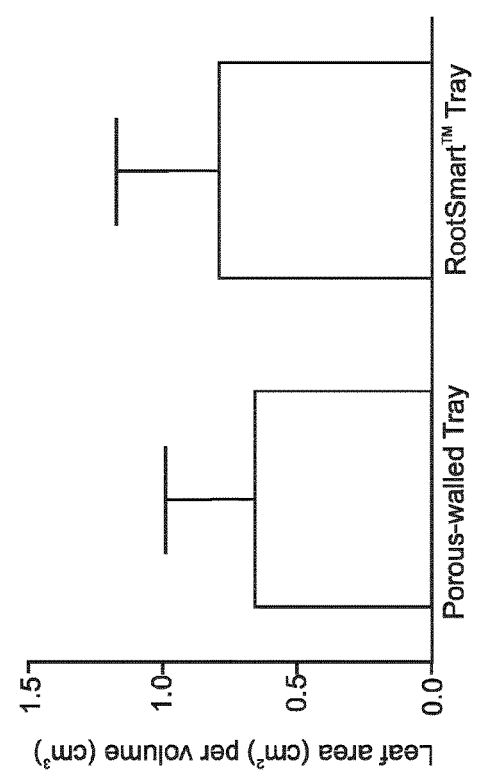
Figure 8D:
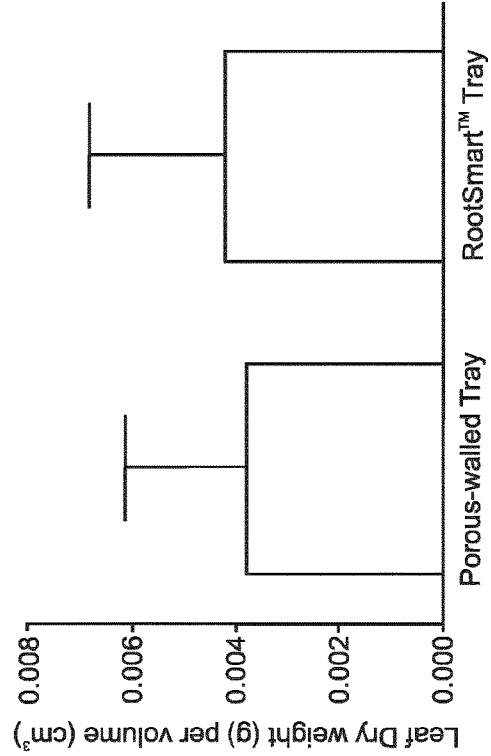
Figure 9B:
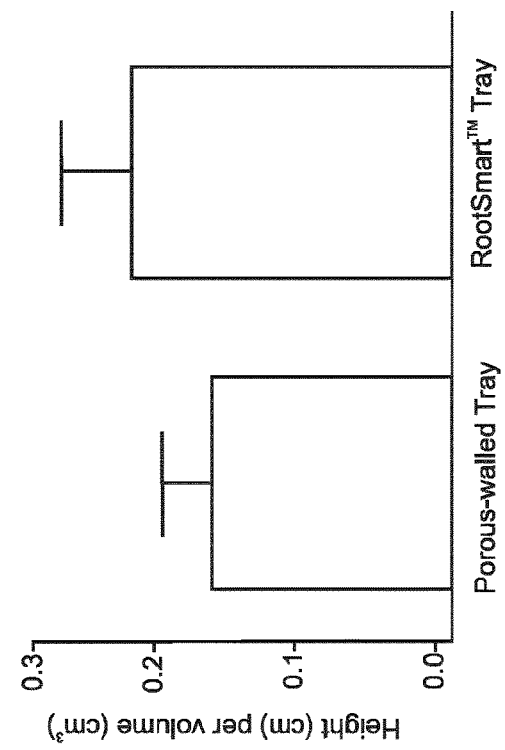
FIG. 9 depicts graphs showing effects of tray type on trunk cross sectional area (TCSA) (FIG. 9A), height (FIG. 9B), leaf dry weight (FIG. 9C) and leaf area per substrate volume (FIG. 9D) for quaking aspen seedlings grown in a propagation tray of the present invention (RootSmart™ Tray) and a prior art tray (Porous-walled Tray), where data means are ±SE (n=30), illustrating that the RootSmart™ Tray produced seedlings with significantly greater TCSA and height at $P<0.01$.
Figure 9D:
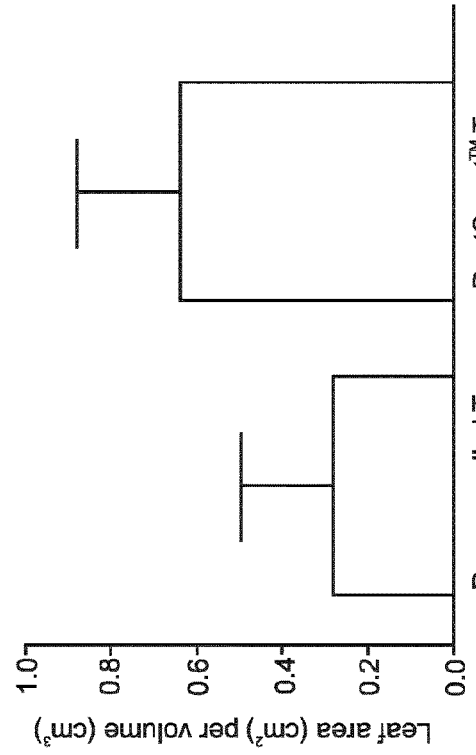
Figure 9A:
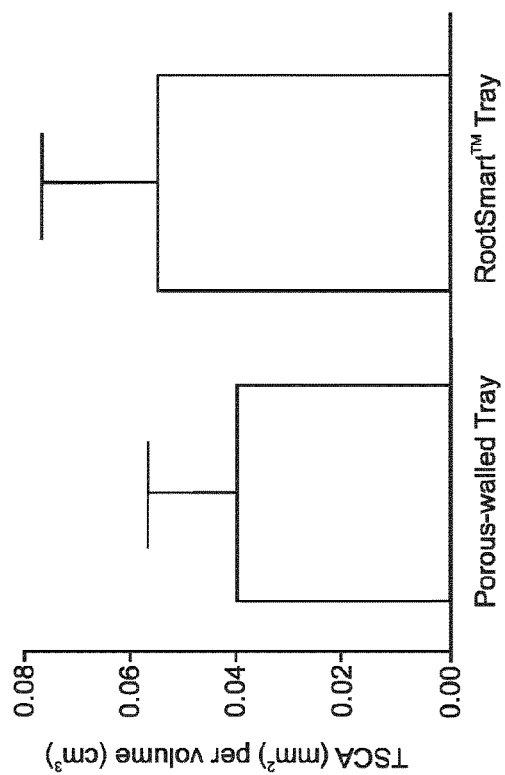
Figure 9C:
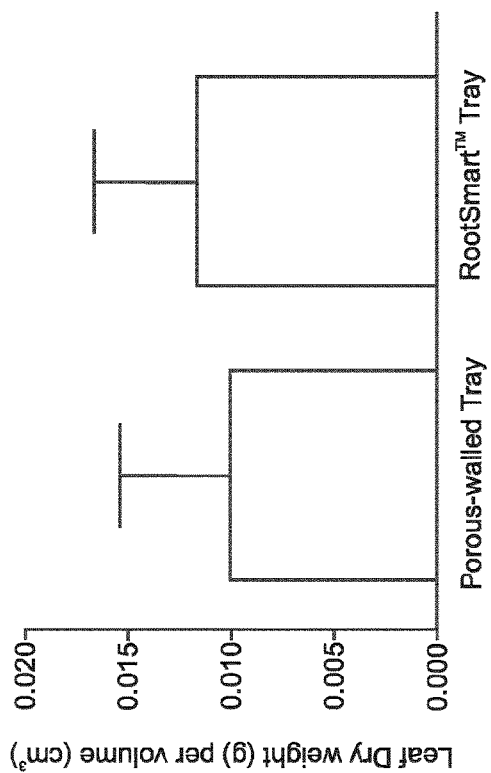
Figure 10B:
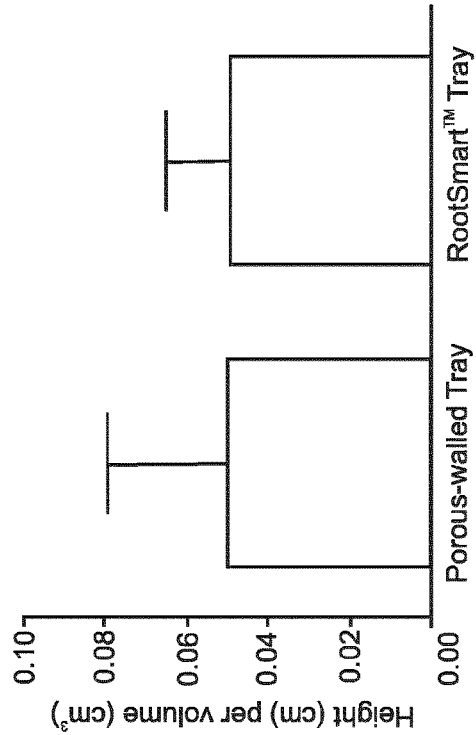
FIG. 10 depicts graphs showing effects of tray type on trunk cross sectional area (TCSA) (FIG. 10A), height (FIG. 10B), leaf dry weight (FIG. 10C) and leaf area per substrate volume (FIG. 10D) for red oak seedlings grown in a propagation tray of the present invention (RootSmart™ Tray) and a prior art tray (Porous-walled Tray), where data means are ±SE (n=30), illustrating that the RootSmart™ Tray produced seedlings with significantly greater TCSA, leaf dry weight and leaf area at $P<0.0001$.
Figure 10D:
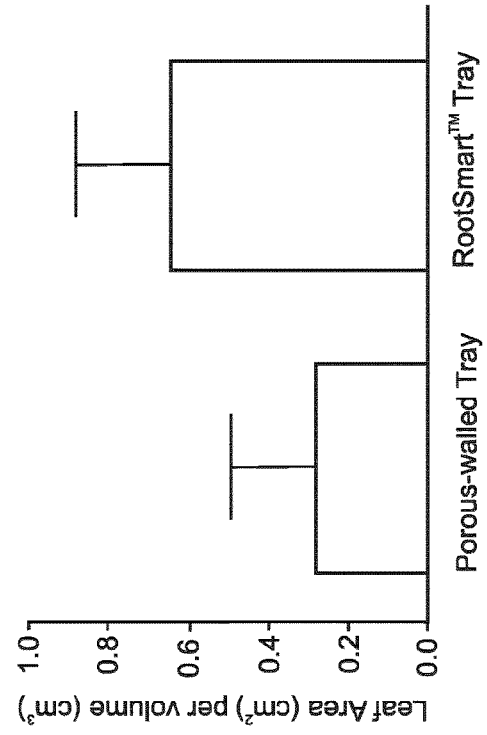
Figure 10A:
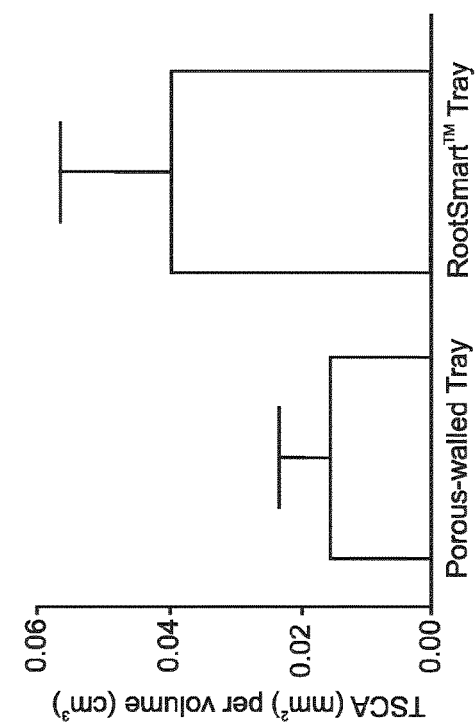
Figure 10C:
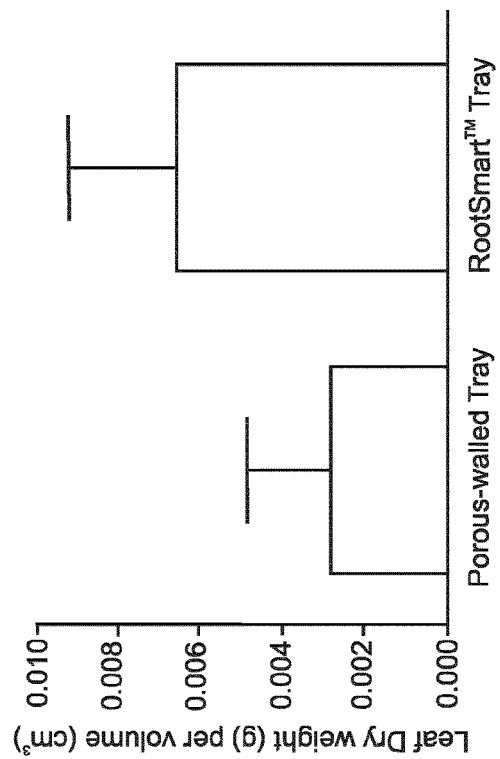

FIG. 7 shows the effect on root dry weight (g) per total root length (cm). The RootSmart™ Tray also demonstrated significantly greater root dry weight to root length ratio for quaking aspen compared to the Solid-walled Tray. This is particularly important for a species like quaking aspen that is notoriously challenging to grow because of the vigor of the root systems, which can quickly outgrow the plug volumes resulting in diving or circling roots. As indicated in FIG. 7, root dry weight of the seedlings in the RootSmart™ Tray were the most balanced in terms of root architecture when compared to the Solid-walled Tray which had long thin roots that dive to the bottom of the container.

The propagation tray of the present invention also outperformed an air-pruning tray that was identified as the best tree seedling plug tray commercially available in terms of above-ground growth parameters, i.e. the Porous-walled Tray, (FIG. 8, FIG. 9 and FIG. 10). The growth parameters are presented as by-volume because the substrate volume of the commercial tray (Porous-walled Tray) is significantly more than the substrate volume of the tray of the present invention (RootSmart™ Tray). Red maple seedlings grown in the RootSmart™ Tray performed significantly better with respect to TCSA and height (FIG. 8B). Quaking aspen seedlings grown in the RootSmart™ Tray performed significantly better with respect to trunk cross sectional area (TCSA) (FIG. 9A), height (FIG. 9B) and leaf area (FIG. 9D). Red oak seedlings grown in the RootSmart™ Tray performed significantly better with respect to TCSA (FIG. 10A), leaf dry weight (FIG. 10C) and leaf surface area (FIG. 10D).

Figure 12:
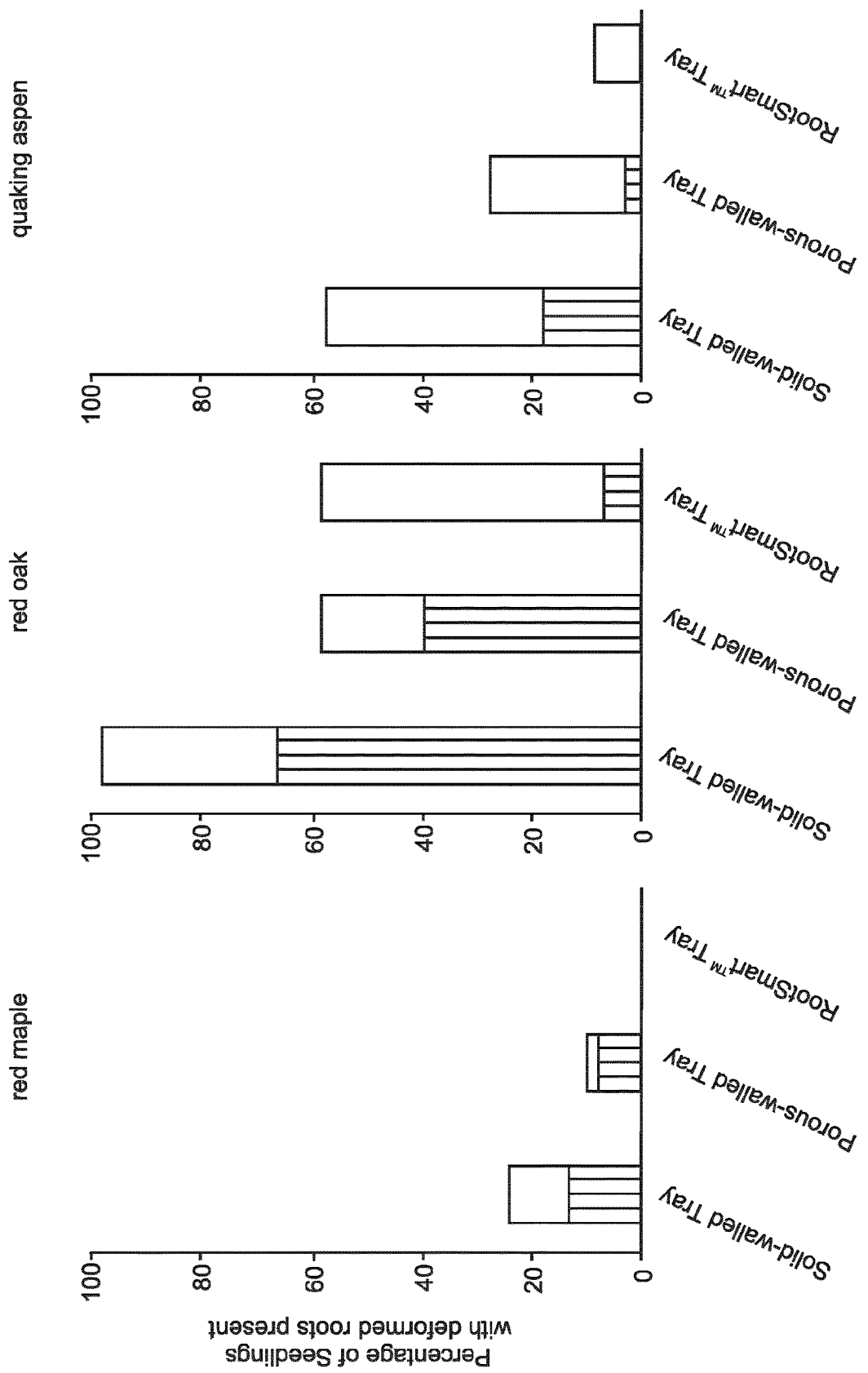
FIG. 12 depicts graphs showing percentages of red maple, red oak and quaking aspen seedlings with deformed roots present at the end of a growing season in a propagation tray of the present invention (RootSmart™ tray) and prior art trays (Solid-walled Tray and Porous-walled Tray), where striped areas within each bar indicate the average proportion of deformed root dry weight to total root dry weight among all seedlings that had deformed roots present.
Figure 13:
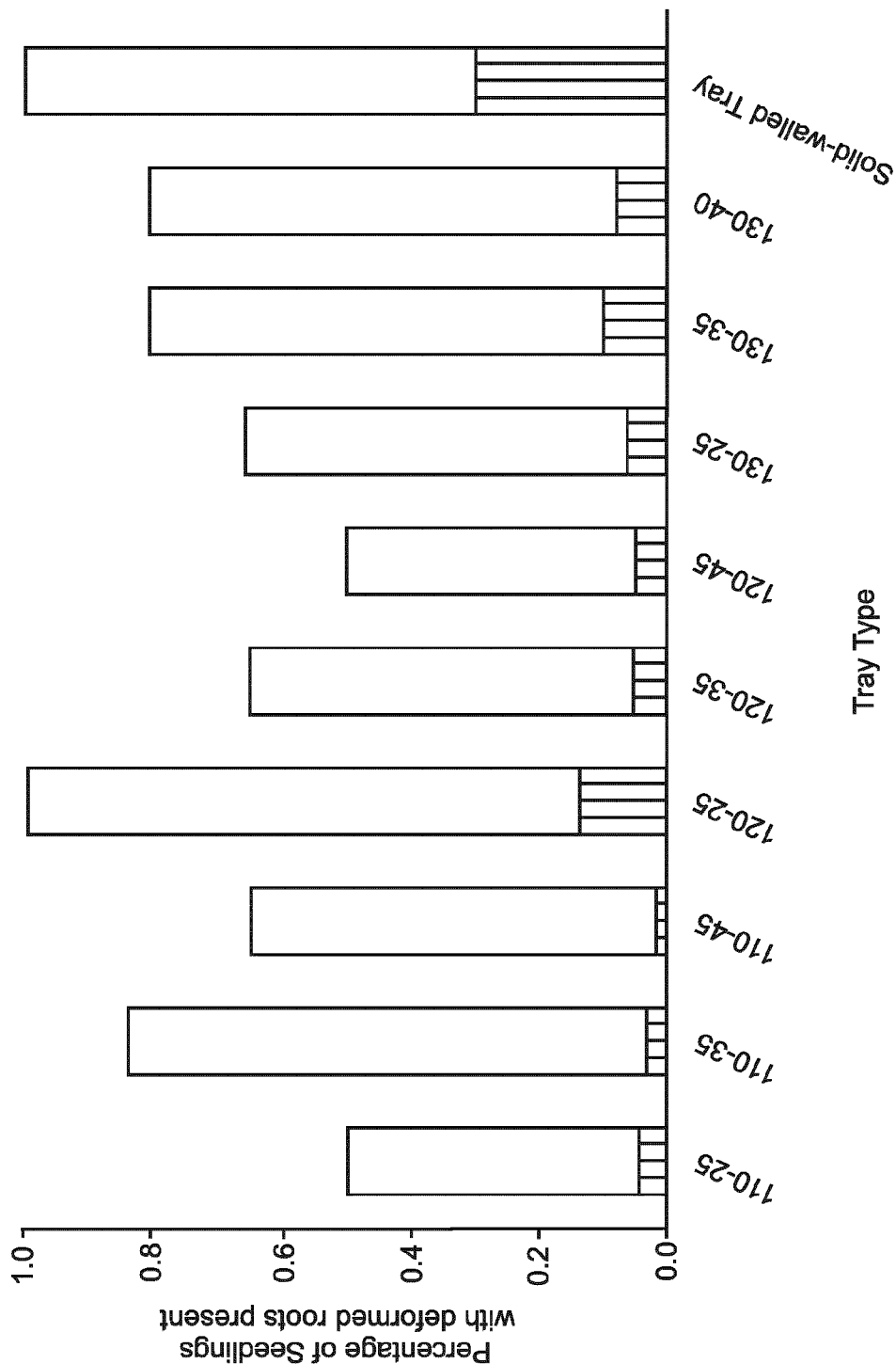
FIG. 13 depicts a graph showing proportion of red oak seedlings with deformed roots present at the end of a growing season in 9 different bottom plate designs of propagation trays of the present invention compared to seedlings grown in a prior art tray (Solid-walled Tray), where each bottom plate design is described by a first number referring to the angle (i.e. 110°, 120° and 130°) and a second number referring to percent openness of the air cells to the air (i.e. 25%, 35%, 40% and 45%), and striped areas within each bar indicate the average proportion of deformed root dry weight to total root dry weight among all seedlings with deformed roots present.
Figure 14:
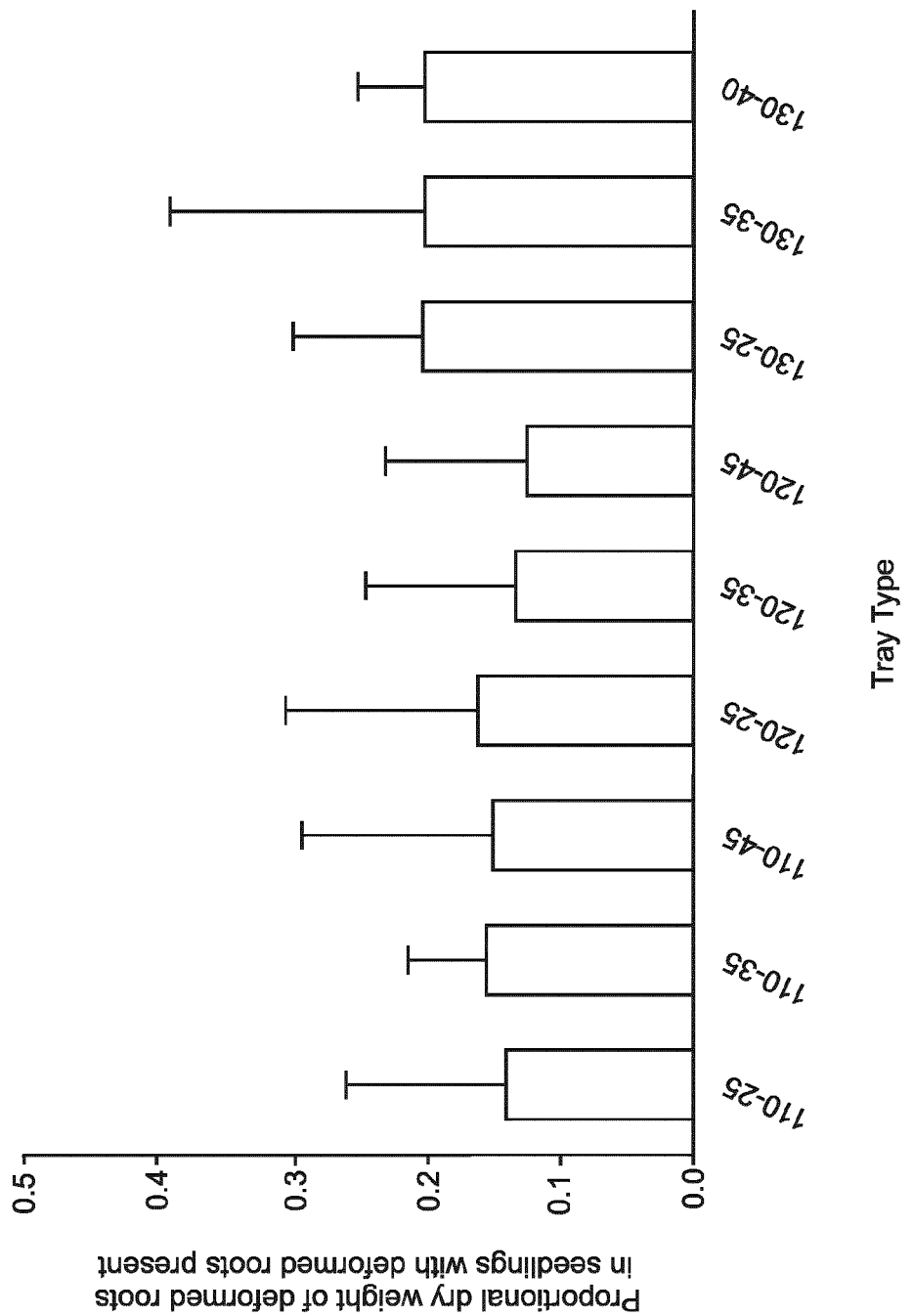
FIG. 14 depicts a graph showing average proportions of deformed root dry weight to total root dry weight among all trembling aspen seedlings with deformed roots present in 9 different bottom plate designs of propagation trays of the present invention, where each bottom plate design is described by a first number referring to the angle (i.e. 110°, 120° and 130°) and a second number referring to percent openness of the air cells to the air (i.e. 25%, 35%, 40% and 45%), ($p<0.05$) using Tukey's multiple comparisons test with error bars representing 95% confidence intervals, where at a 95% confidence interval the results were not significantly different.
Figure 15:
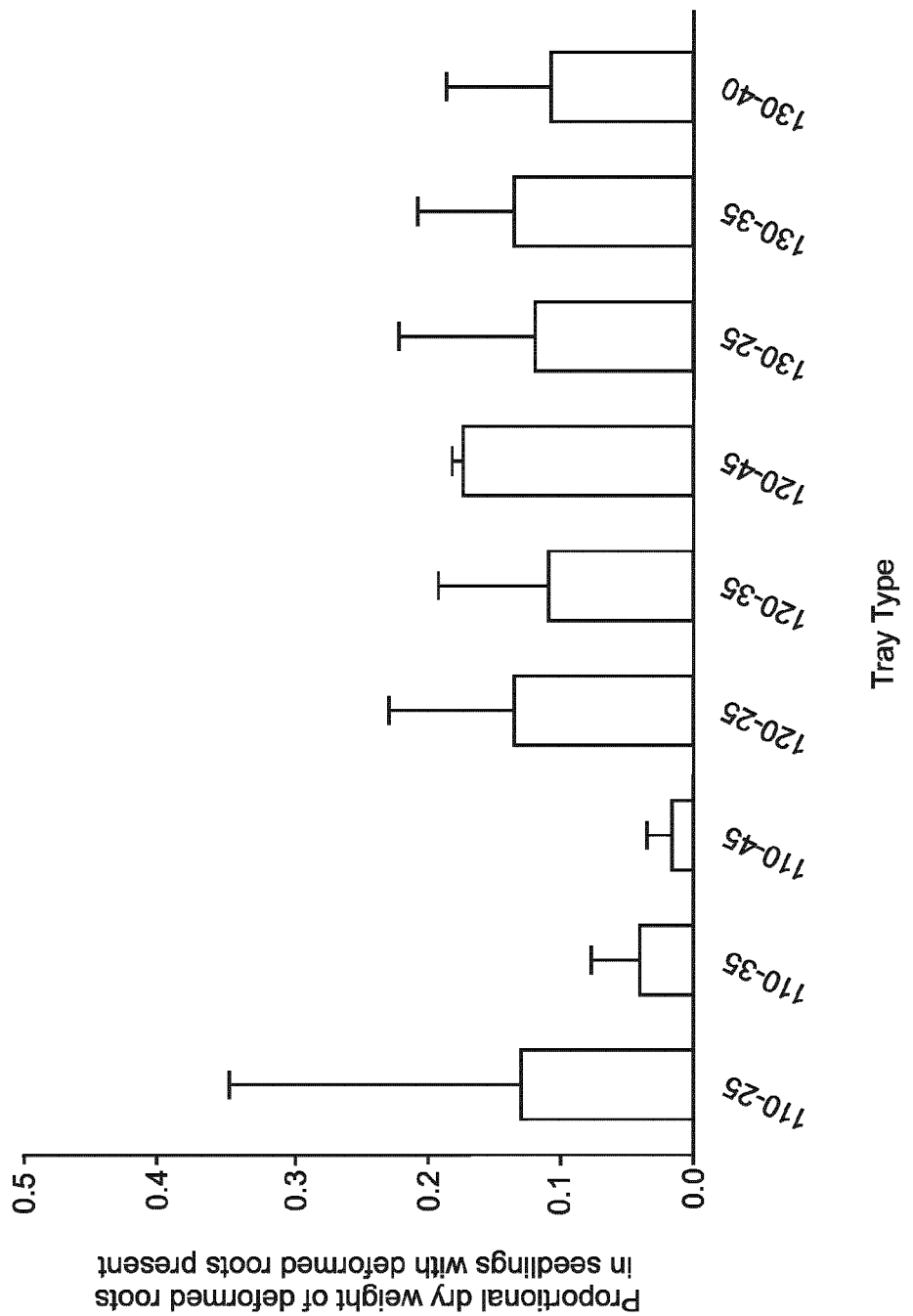
FIG. 15 depicts a graph showing average proportions of deformed root dry weight to total root dry weight among all red oak seedlings with deformed roots present in 9 different bottom plate designs of propagation trays of the present invention, where each bottom plate design is described by a first number referring to the angle (i.e. 110°, 120° and 130°) and a second number referring to percent openness of the air cells to the air (i.e. 25%, 35%, 40% and 45%), ($p<0.05$) using Tukey's multiple comparisons test with error bars representing 95% confidence intervals; where at a 95% confidence interval the results were not significantly different.
Figure 17:
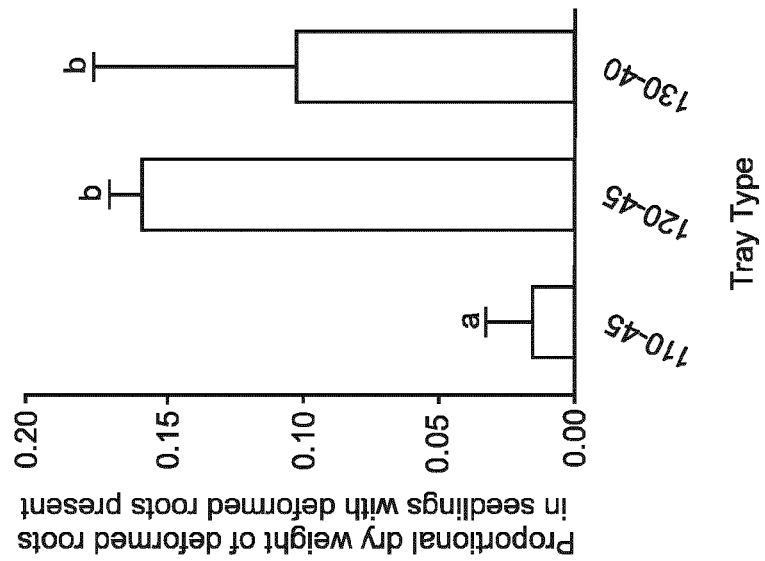
Figure 16:
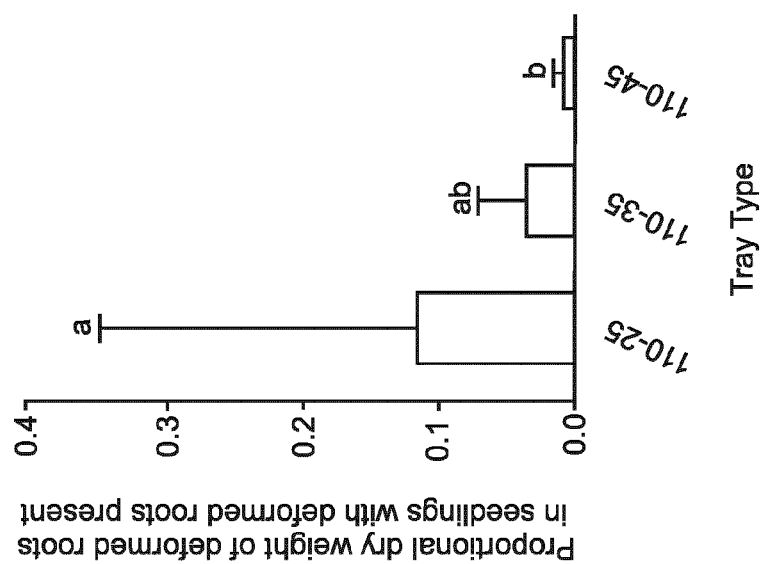
FIG. 16 depicts a graph showing average proportions of deformed root dry weight to total root dry weight among all red oak seedlings with deformed roots present in 3 different bottom plate designs of propagation trays of the present invention, where each bottom plate design is described by a first number referring to the angle (i.e. 110°) and a second number referring to percent openness of the air cells to the air (i.e. 25%, 35% and 45%), and lowercase letters indicate significant differences among the designs ($p<0.05$) using Tukey's multiple comparisons test with error bars representing 95% confidence intervals; and, FIG. 17 depicts a graph showing average proportions of deformed root dry weight to total root dry weight among all red oak seedlings with deformed roots present in 3 different bottom plate designs of propagation trays of the present invention, where each bottom plate design is described by a first number referring to the angle (i.e. 110°, 120° and 130°) and a second number referring to percent openness of the air cells to the air (i.e. 40% and 45%), and lowercase letters indicate significant differences among the designs ($p<0.05$) using Tukey's multiple comparisons test with error bars representing 95% confidence intervals.

FIG. 12 depicts the percentages of red maple, red oak and quaking aspen seedlings that were found to have root deformities present, and of those seedlings, what proportion of root dry weight was deformed. Statistical analysis revealed that the RootSmart™ Tray had significantly fewer defects than the Solid-walled tray for red maple and quaking aspen, and significantly fewer defects than both the Solid-walled Tray and Porous-walled Tray for red oak.

FIG. 13, FIG. 14, FIG. 15, FIG. 16 and FIG. 17 show the results of tests involving propagation trays of the present invention comprising bottom plates having air cells designed with three different angles (110°, 120° and 130°) and four different levels of openness (25%, 35%, 40% and 45%) in order to determine the best combination that would reduce root deflections at the base of Ellepots™. Statistical analysis compared the tray types with equivalent angles (110°), but varying levels of openness (25%, 35% and 45%), in addition to similar levels of openness (40% and 45%) and varying angles (110°, 120° and 130°). A RootSmart™ Tray in which the air cells have an angle of about 110° and an openness of about 45% resulted in the least amount of root deformities in red oak seedlings when compared against air cells with similar openness, as well as with similar angles, at a 95% confidence interval. However, when compared against all other air cells, results were not significantly different at a 95% confidence interval.

It is apparent from these experiments that the propagation tray of the present invention provides significantly better results than commercially successful propagation trays of the prior art.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A propagation tray for growing a plurality of plug plants in bounded transplantable growing media, the tray comprising:
   (a) a top plate and a bottom plate spaced apart to provide a gap between the top and bottom plates,
   the top plate comprising a first array of apertures configured to receive therethrough plants in bounded transplantable growing media and to limit lateral movement of the bounded transplantable growing media in the first array of apertures,
   the bottom plate comprising a second array of apertures corresponding to the first array of apertures, the second array of apertures configured to retain the bounded transplantable growing media at the bottom plate proximate a bottom of the bounded transplantable growing media;
   (b) a plurality of air cells associated with and disposed below the second array of apertures, the bounded transplantable growing media retained at the bottom plate substantially above the air cells, each air cell comprising a wall structure defining a volume of the air cell, the wall structure comprising at least one port configured to permit drainage of water from the air cell and/or ventilation of the air cell, the air cell configured to guide root growth toward the at least one port; and,
   (c) at least one support configured to support the tray on a surface while providing a gap between the surface and bottoms of the wall structures of the air cells.

2. The tray according to claim 1, wherein bottoms of the bounded transplantable growing media are supported on the wall structures of the air cells.

3. The tray according to claim 1, wherein the gap between the top and bottom plates is substantially unbounded.

4. The tray according to claim 1, wherein the gap between the surface and bottoms of the wall structures of the air cells is substantially unbounded.

5. The tray according to claim 1, wherein the apertures of the first array of apertures are the same size as and concentric with the apertures of the second array of apertures.

6. The tray according to claim 1, wherein the apertures of the first array of apertures are larger than and concentric with the apertures of the second array of apertures.

7. The tray according to claim 1, wherein the wall structure comprises a conical frustum having opposed faces, one face having a larger diameter than the other face, the face having the larger diameter located where the air cell is associated with an aperture of the second array of apertures.

8. The tray according to claim 7, wherein the wall structure has an interior angle of decline in a range of about 110° to about 130°.

9. The tray according to claim 1, wherein the at least one port comprises an open bottom or an opening in a bottom of the air cell.

10. The tray according to claim 1, wherein the at least one port comprises one or more side ports in the wall structure having a combined total size in a range of about 25% to about 45% of total surface area of sides of the wall structure.

11. The tray according to claim 10, wherein the one or more side ports comprises four side ports spaced equidistantly around the wall structure.

12. The tray according to claim 1, wherein the wall structure has a smooth interior surface.

13. The tray according to claim 1, wherein 82% or more of the bounded transplantable growing media supported in the tray is exposed to air.

14. The tray according to claim 1, wherein 90% or more of the bounded transplantable growing media supported in the tray is exposed to air.

15. The tray according to claim 1, wherein the at least one support comprises four legs.

16. The tray according to claim 1, wherein the at least one support comprises a base connected to the bottom plate in spaced apart relation.

17. The tray according to claim 1, wherein the top plate is separable from the bottom plate.

18. The tray according to claim 1, wherein the top plate is inseparable from the bottom plate.

* * * * *